United States Patent
Galand et al.

(10) Patent No.: US 6,647,008 B1
(45) Date of Patent: Nov. 11, 2003

(54) METHOD AND SYSTEM FOR SHARING RESERVED BANDWIDTH BETWEEN SEVERAL DEPENDENT CONNECTIONS IN HIGH SPEED PACKET SWITCHING NETWORKS

(75) Inventors: Claude Galand, LaColle/Loup (FR); Marcel Villaflor, Katonah, NY (US)

(73) Assignee: IBM Corporation, Armonk, NY (US)

(*) Notice: Subject to any disclaimer, the term of this patent is extended or adjusted under 35 U.S.C. 154(b) by 0 days.

(21) Appl. No.: 09/097,131

(22) Filed: Jun. 12, 1998

(30) Foreign Application Priority Data

Dec. 19, 1997 (EP) .............................. 97480094

(51) Int. Cl.⁷ .............................................. H04L 12/44
(52) U.S. Cl. ....................... 370/389; 370/230; 370/254; 370/395.2
(58) Field of Search .............................. 370/369, 395.2, 370/395.21, 229, 230, 231, 232, 233, 254, 235, 252

(56) References Cited

U.S. PATENT DOCUMENTS

| | | | |
|---|---|---|---|
| 5,179,556 A | | 1/1993 | Turner ........................ 370/94.1 |
| 5,347,511 A | * | 9/1994 | Gun ........................... 370/230 |
| 5,388,097 A | | 2/1995 | Baugher et al. ............ 370/85.5 |
| 5,479,404 A | | 12/1995 | Francois et al. .............. 370/84 |
| 5,548,579 A | | 8/1996 | Lebrun et al. ................ 370/16 |
| 5,687,167 A | * | 11/1997 | Bertin et al. ................ 370/254 |
| 5,848,055 A | | 12/1998 | Fedyk et al. ................ 370/228 |
| 5,884,037 A | | 3/1999 | Aras et al. ............. 395/200.56 |
| 5,949,758 A | | 9/1999 | Kober ........................ 370/232 |
| 6,011,804 A | * | 1/2000 | Bertin et al. ................ 370/230 |
| 6,072,773 A | | 6/2000 | Fichou et al. ............... 370/230 |
| 6,092,113 A | | 7/2000 | Macshima et al. .......... 709/230 |

OTHER PUBLICATIONS

Guerin et al., Equivalent Capacity and Its Application to Bandwidth Allocation in High–Speed Networks, IEEE, pp. 968–973, Sep. 1991.*

* cited by examiner

Primary Examiner—Wellington Chin
Assistant Examiner—Frank Duong
(74) Attorney, Agent, or Firm—Cesari and McKenna, LLP

(57) ABSTRACT

A method for establishing a network connection through a link issuing from a physical port is disclosed. The link has an aggregation of connections. The network connection has a required capacity. The method first computes, from mean bit rates of the aggregation of connections, a mean aggregate bit rate over the aggregation of connections. The method secondly computes, from burst durations from the aggregation of connections, a mean aggregate burst duration over the aggregation of connections. The method thirdly computes an equivalent capacity required on the link by the aggregation of connections, the equivalent capacity being a function of the mean aggregate bit rate and the mean aggregate burst duration. The method fourthly computes an aggregate equivalent capacity, the aggregate equivalent capacity being a function of the equivalent capacity and the required capacity of the connection. The method fifthly computes a bandwidth that would be reserved on the link after establishing the connection, the bandwidth being a minimum of a Gaussian approximation and the aggregate equivalent capacity. Then the network connection is established if the bandwidth is less than or equal to a total capacity for the link.

8 Claims, 14 Drawing Sheets

TOPOLOGY DATABASE
Link characteristics

| CHARACTERISTIC | | | LINK VALUES | | |
|---|---|---|---|---|---|
| NAME | DESCRIPTION | A | B | ... | N |
| C | Total capacity (bps) | $C_A$ | $C_B$ | ... | $C_N$ |
| rf | Reservable fraction (%) | $rf_A$ | $rf_B$ | ... | $rf_N$ |
| $\hat{C}_R$ | Total reserved bandwidth (bps) | $\hat{C}_{R,A}$ | $\hat{C}_{R,B}$ | ... | $\hat{C}_{R,N}$ |
| $M_{NR}$ | Total bandwidth used by NR traffic (bps) | $M_{NR,A}$ | $M_{NR,B}$ | ... | $M_{NR,N}$ |
| mps | Maximum packet size (bytes) | $mps_A$ | $mps_B$ | ... | $mps_N$ |

FIG. 5

METHOD AND SYSTEM FOR SHARING RESERVED BANDWIDTH BETWEEN SEVERAL DEPENDENT CONNECTIONS IN HIGH SPEED PACKET SWITCHING NETWORKS

BACKGROUND OF THE INVENTION

1. Technical Field

The present invention relates to bandwidth reservation in high speed packet networks and more particularly to a method and system for sharing reserved bandwidth between several virtual logical connections issuing from a same port attaching external devices.

2. Background Art

High Speed Packet Switching Networks

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video and traffic among channel attached hosts, business, engineering workstations, terminals, and small to intermediate file servers. This vision of a high speed multi-protocol network is the driver for the emergence of fast packet switching networks architectures in which data, voice, and video information are digitally encoded, chopped into small packets and transmitted through a common set of nodes and links. An efficient transport of mixed traffic streams on very high speed lines means for these new network architecture a set of requirements in term of performance and resource consumption which can be summarized in the paragraphs below, as follows:

(a) a very high throughput and a very short packet processing time, (b) a very large flexibility to support a wide range of connectivity options, (c) an efficient flow and congestion control; and (d) dependent connections.

(a) Throughput and Processing Time:

One of the key requirement of high speed packet switching networks is to reduce the end to end delay in order to satisfy real-time delivery constraints and to achieve the necessary high nodal throughput for the transport of voice and video. Increases in link speeds have not been matched by proportionate increases in the processing speeds of communication nodes and the fundamental challenge for high speed networks is to minimize the processing time and to take full advantage of the high speed/low error rate technologies, most of the transport and control functions provided by the new high bandwidth network architectures are performed on an end to end basis. The flow control and particularly the path selection and bandwidth management processes are managed by the access points of the network which reduces both the awareness and the function of the intermediate nodes.

(b) Connectivity:

In high speed networks, the nodes must provide a total connectivity. This includes attachment of the user's devices, regardless of vendor or protocol, and the ability to have the end user communicate with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.

(c) Congestion and Flow Control:

Communication networks have at their disposal limited resources to ensure an efficient packets transmission. An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth. An ideal network should be able to transmit useful traffic directly proportional to the traffic offered to the network and as far as the maximum transmission capacity is reached. Beyond this limit, the network should operate at its maximum capacity whatever the demand.

(d) Dependent Connections:

Private Network (PN) and Value-Added Network (VAN) service providers usually build their networks upon carrier transmission facilities. The expense for carrier transmission facilities represents an important part (about 30% to 60%) of the PN's or VAN's total operating expense. As such, their profits are directly related to their ability to minimize monthly transmission expenses while continually meeting their customers' end-to-end communications needs. Nodal equipment that can utilize the transmission facilities more efficiently than traditional carrier systems are typically selected by PNs and VANs.

Today, the replacement of traditional Time Division Multiplex (TDM) equipment by high speed packet switching equipment has significantly reduced the amount of transmission facilities needed in a Private Network (PN) or in a Value-Added Network (VAN). But much like TDM networks, packet switching networks approach falls short of reducing the amount of transmission facilities (transmission trunks) required in the backbone network. The reason for this is that most packet switching network architectures assume that all incoming traffic streams are "independent" with respect to each other. That is, any customer device attached to the network can provide incoming traffic to the network at any instant of time. This is not true for logical virtual connections as in the case of Frame Relay (FR), Local Area Network (LAN), or Asynchronous Transfer Mode (ATM) traffic. In fact, the logical connections of a FR, LAN or ATM attached device must consider the traffic sources from all logical virtual connections on a given physical port as "dependent". That is, given one logical virtual connection is bursting a traffic stream, no other logical virtual connection can be bursting at the same time.

For example, a network architecture such as NBBS (refer to IBM's publication entitled "Networking Broadband Services (NBBS)—Architecture Tutorial" IBM ITSC, June 1995 GG24-4486-00) reserves for virtual Frame Relay (FR) connections more bandwidth than necessary on the backbone network. This occurs because NBBS considers each Data Link Connection Identifier (DLCI) (refer to Frame Relay core aspects ANSI T1.618-1991 and ITU-T Q.922 Annex A) as an independent traffic generator, and reserves bandwidth on the backbone network accordingly.

FIG. 4 illustrates virtual Frame Relay/ATM (FR/ATM) connections between four nodes, named A, B, C, and D. Digital Terminal Equipment are connected to ports in these nodes by means of access links. From the Frame Relay/ATM port in origin node A, three virtual logical connections are established respectively towards destination ports B, C and D. Assuming in this example that the traffic is the same for each connection:

R (Access Rate)=2 Mbps,

CIR (Committed Information Rate)=300 kbps, $B_c$ (Burst Committed)=4 kbytes

The bandwidth reserved on a trunk with a multiplexing buffer of 64 kbytes in order to guarantee a packet loss probability of $\epsilon=5\times10^{-8}$, is approximately 700 kbps for each connection.

The bandwidth reserved by the NBBS architecture on a trunk to support a connection is defined according to the following equation:

$$\hat{c} = R \frac{y - x + \sqrt{[y-x]^2 + 4Xpy}}{2y} \simeq 700 \text{ kbps}$$

X=64000 bytes×8=512000 bits (size of the buffer where packets are queued), $$b = \frac{B_c}{R} = \frac{4 \text{ kbytes} \times 8}{2048 \text{ kbps}} = 16 \text{ ms (average burstiness)},$$

y=In(1/ε)b(1−ρ)R, and p=CIR/R=300 kbps/2048 kbps≈app 0.15.

Therefore, the bandwidth reserved on each trunk is given in the table below:

| Trunk number | Number of connections on trunk | Amount of bandwidth reserved by NBBS (Kbps) |
|---|---|---|
| Trunk 1 | 3 | 2100 |
| Trunk 2 | 1 | 700 |
| Trunk 3 | 2 | 1400 |
| Trunk 4 | 1 | 700 |
| Trunk 5 | 1 | 700 |

This example shows that the total bandwidth that should be reserved for 3 connections on Trunk 1 is about 2100 kbps (3 connections at 700 kbps). The value is higher than the access rate (R=2 Mbps) of the physical port (FR/ATM port A) supporting these connections. This situation is clearly not acceptable. In the simple case where a physical port is fully loaded with 7 connections (7×300 kbps=2 Mbps) and where all the connections issuing from said port are transmitted over a single trunk (Trunk 1), the bandwidth requirement is about 4.9 Mbps (7×700 kbps), while it is clear that the 2 Mbps stream produced by said port can be transmitted over a 2 Mbps trunk. Again, this occurs because NBBS considers each connection as an independent traffic generator and supposes that all connections can be bursty at the same time. Considering this worst case, NBBS reserves 4.9 Mbps to be sure to be able to transmit 2 Mbps.

SUMMARY OF THE INVENTION

An object of the present invention is to exploit the property of dependent virtual logical connections for saving bandwidth.

More particularly, the present invention is directed to a system and method in a packet switching communication network comprising a plurality of nodes interconnected with transmission trunks, of sharing reserved bandwidth between several connections issuing from a same physical port in an access node. Said system and method are characterized in that, on each trunk, an aggregate bandwidth is reserved for all connections issuing from a same physical port, said aggregate bandwidth being less than the sum of the bandwidth reserved for each connection considered individually.

In a network where the bandwidth reserved for each individual connection is equal to the equivalent capacity of the connection, the aggregate bandwidth reserved for all dependent connections is a function of:

(1) the mean bit rate of the aggregation of the connections issued from said port, and (2) the mean burst duration of the aggregation of the connections issued from said-port.

BRIEF DESCRIPTION OF THE DRAWINGS

FIG. 5 shows the link characteristics stored in the Topology Database of FIG. 3.

DESCRIPTION OF THE PREFERRED EMBODIMENT

High Speed Communications

Figure 1:
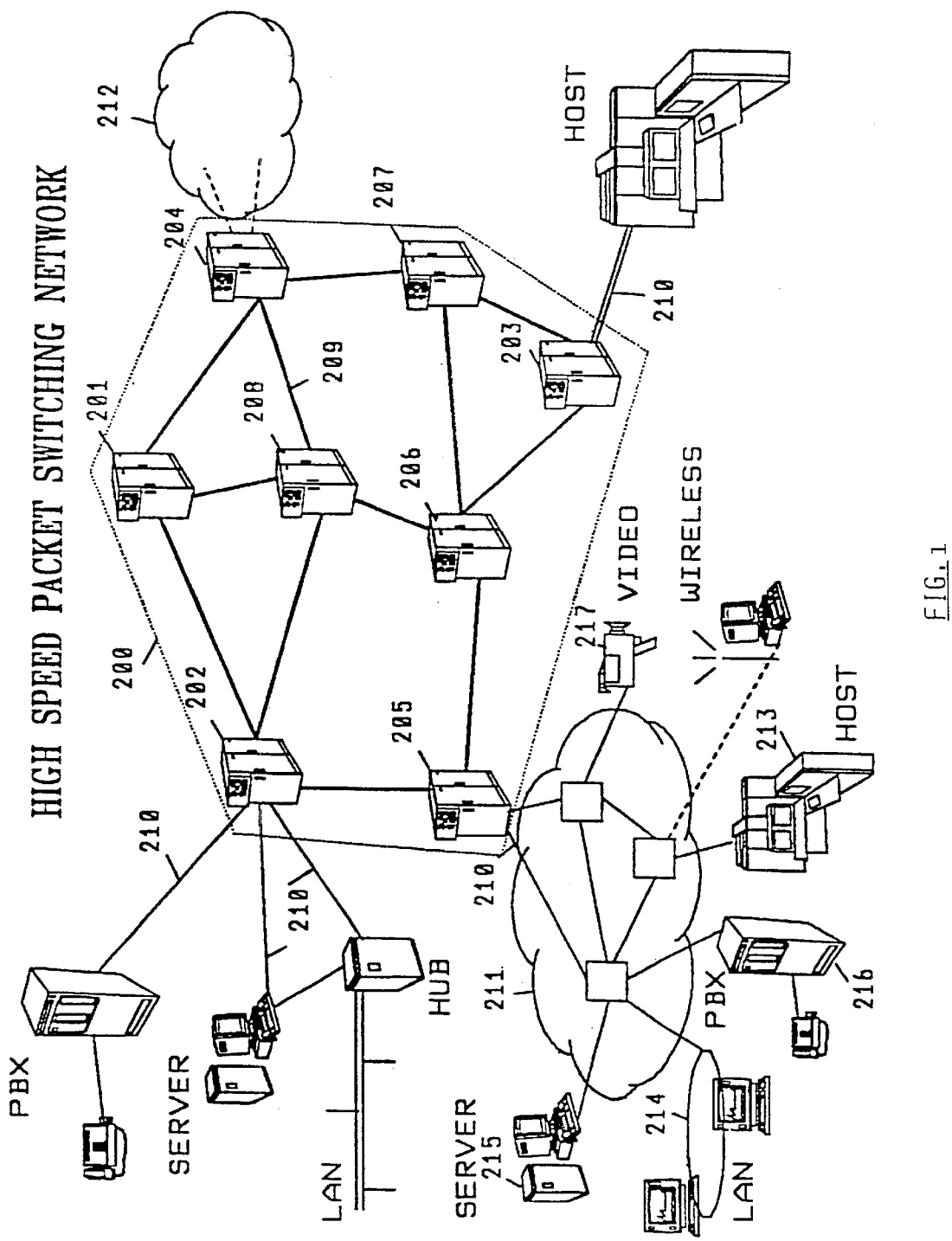
FIG. 1 shows a typical model of a high speed packet switching network including node incorporating the principles of the present invention.

As illustrated in FIG. 1, a typical model of communication system is made of several user networks 212 communicating through a high performance network 200 using private lines, carrier provided services, or public data networks. Each user network can be described as a set of communication processors and links 211 interconnecting large computers used as enterprise servers 213, user groups using workstations or personal computers attached on LAN (Local Area Networks) 214, applications servers 215, PBX (Private Branch eXchange) 216 or video servers 217. These user networks, spread in different establishments, need to be interconnected through wide area transport facilities and different approaches can be used for organizing the data transfer. Some architectures involve the checking for data integrity at each network node, thus slowing down the transmission. Others are essentially looking for a high speed data transfer. To that end the transmission, routing and switching techniques within the nodes are optimized to process the flowing packets toward their final destination at the highest possible rate. The present invention belongs essentially to the latter category and more particularly to the fast packet switching network architecture detailed in the following paragraphs.

High Performance Packet Switching Networks

The general view in FIG. 1 shows a fast packet switching transmission system comprising eight nodes (201 to 208) each node being interconnected by means of high speed communication lines called Trunks 209. The access 210 to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch eXchange (PBX), an application server and a hub through three Ports and communicates through the network by means of the adjacent Transit Nodes 201, 205 and 208.

Switching Nodes

Each network node (201 to 208) includes a Routing Point, described hereinafter, where the incoming data packets are selectively routed on the outgoing Trunks towards the neighboring Transit Nodes. Such routing decisions are made according to the information contained in the header of the data packets. In addition to the basic packet routing function, the network nodes provide ancillary services such as:

the determination of routing paths for packets originated in the node, directory services like retrieving and updating information about network users and resources, the maintaining of a consistent view of the physical network topology, including link utilization information, and the reservation of resources at access points of the network.

According to the present invention, these ancillary services include:

(1) the storage within the node of alternate paths, and (2) the updating of these paths.

Each Port is connected to a plurality of user processing equipment, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network 200 and the generation of a header to route these packets are executed by an Access Agent running in the Port. This header is made of Control, Routing and Redundancy Check Fields.

The Routing Fields contain all the information necessary to route the packet through the network 200 to the destination node to which it is addressed. These fields can take several formats depending on the routing mode specified (connection oriented or connectionless routing mode . . . ).

The Control Fields include, among other things, an encoded identification of the protocol to be used for interpreting the Routing Fields.

The Redundancy Check Fields are used to check for errors in the header itself. If an error is detected, the packet is discarded.

Routing Points

Figure 2:
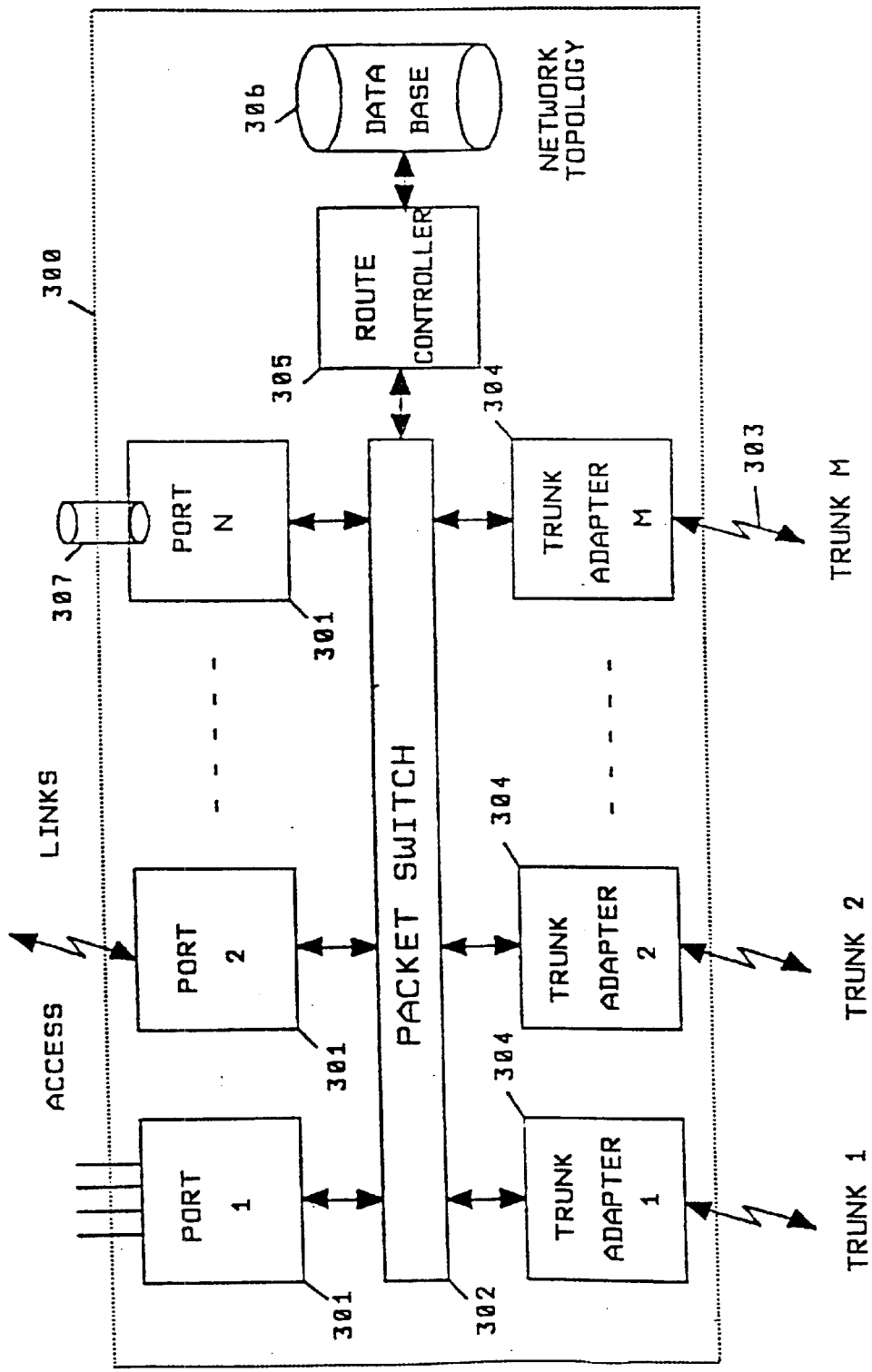
FIG. 2 is a representation of a high speed Routing Point and switching node according to the present invention.

FIG. 2 shows a general block diagram of a typical Routing Point 300 such as it can be found in the network nodes (201 to 208) illustrated in FIG. 1. A Routing Point comprises a high speed packet Switch 302 onto which packets arriving at the Routing Point are entered. Such packets are received:

(1) From other nodes over high speed transmission links 303 via Trunk Adapters 304;

(2) From users via application adapters called Ports 301.

Using information in the packet header, the adapters 304 and 301 determine which packets are to be routed by means of the Switch 302 towards a local user network 307 or towards a transmission link 303 leaving the node. The adapters 301 and 304 include queuing circuits for queuing packets prior to or subsequent to their launch on the Switch 302.

The Route Controller 305 calculates the optimum paths throught the network 200 so as to satisfy a given set of quality-of-services specified by the user and to minimize the amount of network resources used to complete the communication path. Then, it builds the header of the packets generated in the Routing Point. The optimization criteria include the number of intermediate nodes, the characteristics of the connection request, the capabilities and the utilization of the links (Trunks) in the path, . . . The optimum route is stored in a Routing Database 308 for further reuse.

All the information necessary for the routing, about the nodes and transmission links connected to the nodes, are contained in a Network Topology Database 306. Under steady state condition, every Routing Point has the same view of the network. The network topology information is updated when new links are activated, new nodes added to the network, when links or nodes are dropped or when link loads change significantly. Such information is exchanged by means of control messages with all other Route Controllers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions)

The incoming transmission links to the packet Routing Point may comprise links from external devices in the local use networks 210 or links (Trunks) from adjacent network nodes 209. In any case, the Routing Point operates in the same manner to receive each data packet and forward it on to another Routing Point dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Network Management

Network Control Functions

The Network Control Functions are those that control, allocate, and manage the resources of the physical network. Each Routing Point has a set of the foregoing functions in the Route Controller 305 and uses it to facilitate the establishment and the maintenance of the connections between users applications. The Network Control Functions include in particular:

Directory Services
  for retrieving and maintaining information about network users and resources.
Bandwidth Management
  for processing the bandwidth reservation and maintenance messages, and
  for monitoring the current reservation levels on links.
Path Selection
  for choosing the best path for each new connection considering the connection requirements and the current link utilization levels.
Control Spanning Tree
  for establishing and maintaining a routing tree among the network nodes,
  for using it to distribute control information (in parallel) including link utilization, and
  for updating the Topology Database of the nodes with new network configurations or link/node failures.
Topology Update
  for distributing and maintaining, using the Spanning Tree, information about the logical and physical network (including link utilization information) in every node.
Congestion Control
  for enforcing the bandwidth reservation agreements between the network's users and the network which are established at the call set up time, and
  for estimating actual bandwidth and for adjusting reservation if necessary during the life of the connection.

Topology Database (TDB)

The Topology Database contains information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links,
  the state of nodes and links, and
  the link utilization which includes dynamic characteristics like current bandwidth (used and reserved), real-time measurements . . .

Figure 3:
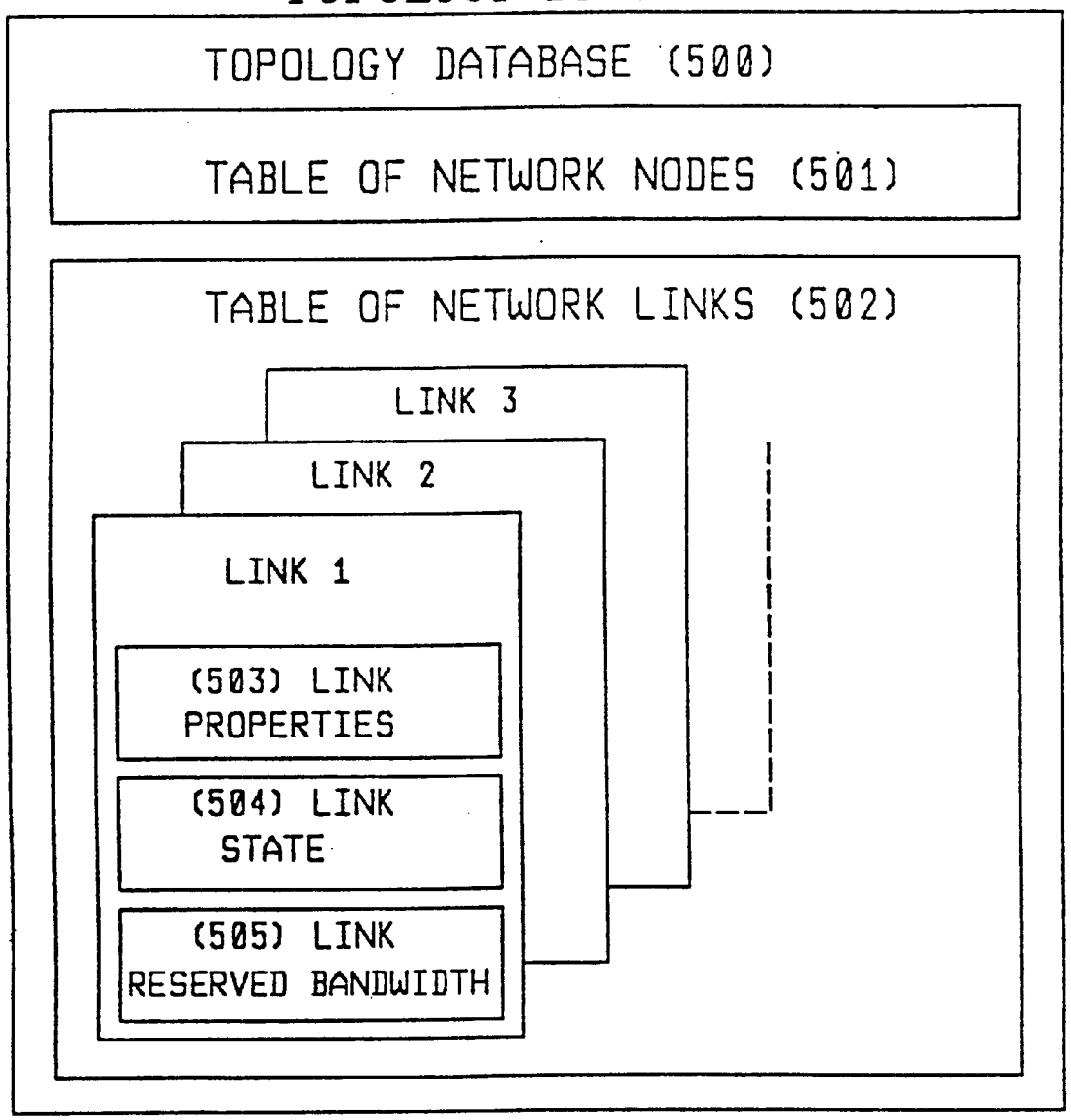
FIG. 3 is a Topology Database structure in the Routing Point of FIG. 2.

The general organization of the Topology Database is shown in FIG. 3. To each resource in the network, nodes 501 or links 502, is associated an entry in the database. In particular, each link entry includes the following characteristics:

503 the Link Physical Properties:
  transmission medium and speed,
  routing mode supported,
  maximum packet size,
  link buffer capacity,
  propagation delay,
  bandwidth reservation supported . . .
504 the link state:
  on-line (link can accept user connections),
  quiesce (link cannot accept additional user connections, but existing connections continue),
  off-line (link cannot accept user connections and existing connections are cancelled) . . .
505 the Link Utilization
  real-time measurements,
  reserved bandwidth, . . .

FIG. 5 shows in a table, some of the information stored in the Topology Database. Though all characteristics of the links are listed in each node, in the present application only a few will be described:

Total Capacity (bps) C
  The Topology Database contains, for each link, its Total Capacity. The value $C_k$ represents the total bandwidth available on the link k between two nodes.

Reservable Fraction (%) rf
  As might be expected, one of the critical characteristics of transmission links is the fraction of the link capacity effectively available. Links cannot be loaded up to a theoretical maximum load (bandwidth) for two reasons:
    first, to set aside bandwidth for network control functions, and
    secondly, to keep the loss probabilities and queuing delays low in the case of short term bandwidth violations by the different traffic sources.
  The reservable fraction of a link rf is the effective percentage of the Total Capacity $C_k$ that can be reserved on the link k, to maintain a reasonable quality of transmission. If $C_k$ is the Total Capacity of the link k, then $R_k \text{rf} \times C_k$ is the Reservable Capacity of this link ($\hat{C}_k \leq R_k \leq C_k$).
    Note: For most network architectures, no more than 85% of the total bandwidth of a link Ck can be explicitly reserved for user traffic (rf<0.85).

Total Reserved Equivalent Capacity (bps) $\hat{C}_{R,k}$
  For a connection i on a link k, the simplest way to provide low/no packet loss would be to reserve the entire bandwidth requested by the user. However, for bursty user traffic, this approach can waste a significant amount of bandwidth across the network. To save resources, the bandwidth amount actually reserved is equal to an "Equivalent Capacity" $\hat{C}_{k,i}$, Equivalent Capacity being a function of the source characteristics and of the network status. The bandwidth reservation falls somewhere between the average bandwidth required by the user and the maximum capacity of the connection.
  The value $$\hat{C}_{r,k} = \sum_{i=1}^{N} \hat{C}_{k,i} = \text{sum}$$

of the reserved Equivalent Capacities represents the total bandwidth reserved on the link k by N connections already established. If the difference between this already reserved link Equivalent Capacity $\hat{C}_{R,k}$ and the Total Reservable Capacity of the link rf×$C_k$ is less than the bandwidth requested by a new reserved connection then the link cannot be selected. However, the link may be selected for a non-reserved connection where no explicit bandwidth reservation is needed.

Total Bandwidth used by Non-Reserved Traffic (bps) $M_{NR,k}$

The value $M_{NR,k}$ represents the total load or bandwidth currently used by non-reserved traffic as measured on the link k.

Total Capacity Used (bps) $\hat{C}_{T,k}$

The Total Bandwidth Used $\hat{C}_{T,k}$ on the link k is computed by adding the total reserved bandwidth $\hat{C}_{R,k}$ and the measured bandwidth $M_{NR,k}$ used by non-reserved traffic.

Maximum Packet Size (bytes) $mps_k$ $mps_k$ is defined as the maximum packet size supported by the link k.

Bandwidth Management

Users are requiring different quality-of-services. In order to provide the various service levels, different types of network connections are established. A connection is defined as a path in the network between the origin access node and the destination access node representing respectively the source user and the target user. Network connections can be classified as reserved or non-reserved. Reserved network connections require bandwidth to be allocated in advance along the chosen path.

Most of the high speed connections are established on a reserved path to guarantee the quality of service and the bandwidth requested by the user. This path across the network is computed by the origin node using information in its Topology Database including current link utilization. The origin node then sends a reservation request along the chosen path, and intermediate nodes (if allowing the reservation) then add this additionally reserved capacity to their total. These changes are reflected in topology broadcast updates sent by the intermediate nodes. Intermediate nodes need not have an awareness of the status of each connection on their adjacent links. If an intermediate node does get too many packets, generally because of unanticipated burstiness, it simply discards them (the user can select a service that will recover from such discards).

Depending on the node type, the function of the Bandwidth Management is:

in the origin node,
   to identify the best possible route according to the network status and the connection parameters including the connection priority,
   to reserve at connection setup, the bandwidth required by the network connections and to maintain this bandwidth for the duration of the connection.
   to reject the connection if resources needed to satisfy the request are not available in the network.
in a transit node,
   to administer the bandwidth reservations on the links, and
   according to the present invention to administer the bandwidth reservations on the links of the alternate paths.

Figure 6:
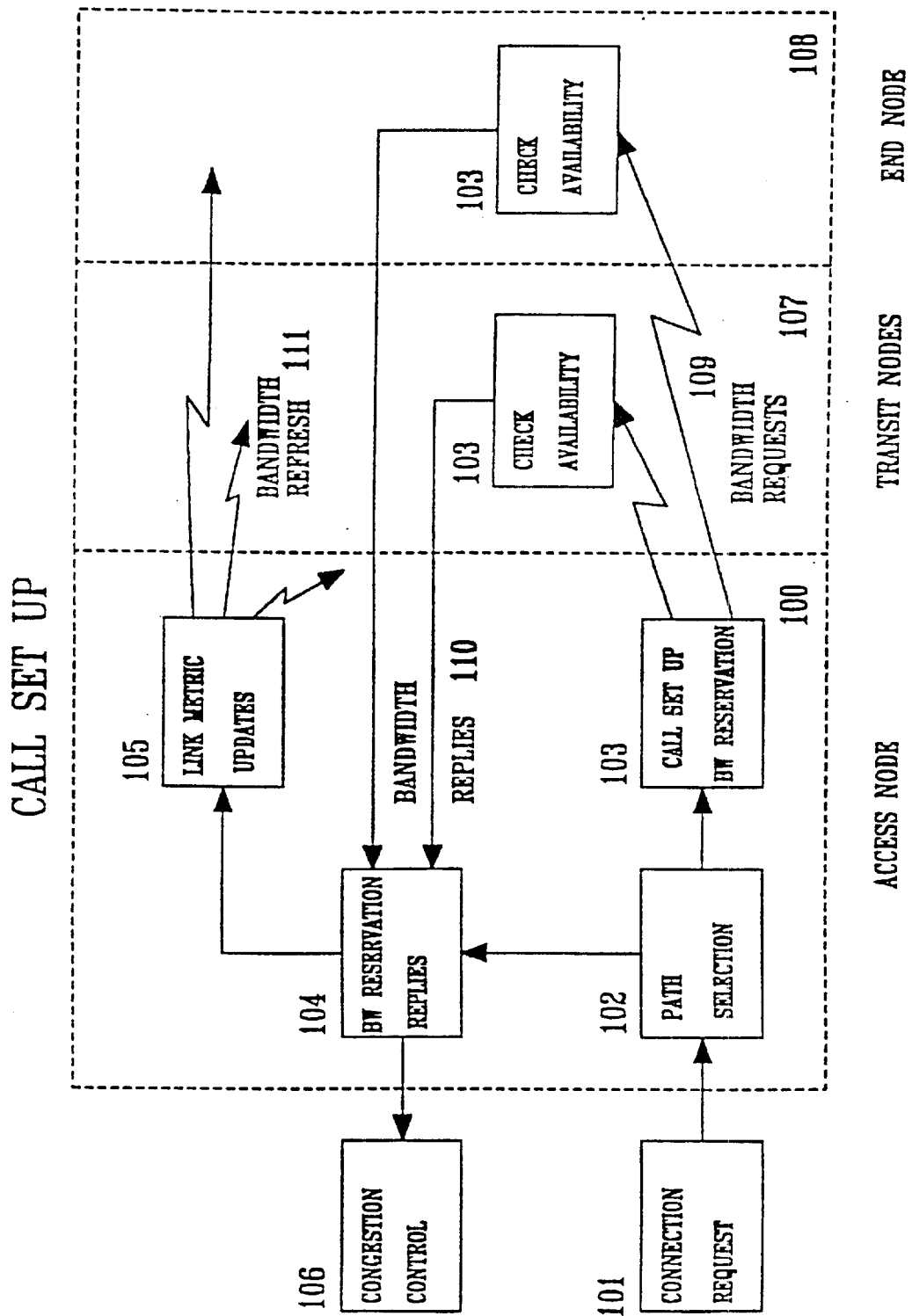
FIG. 6 is a representation of a bandwidth reservation call set up process of the present invention.
Figure 7:
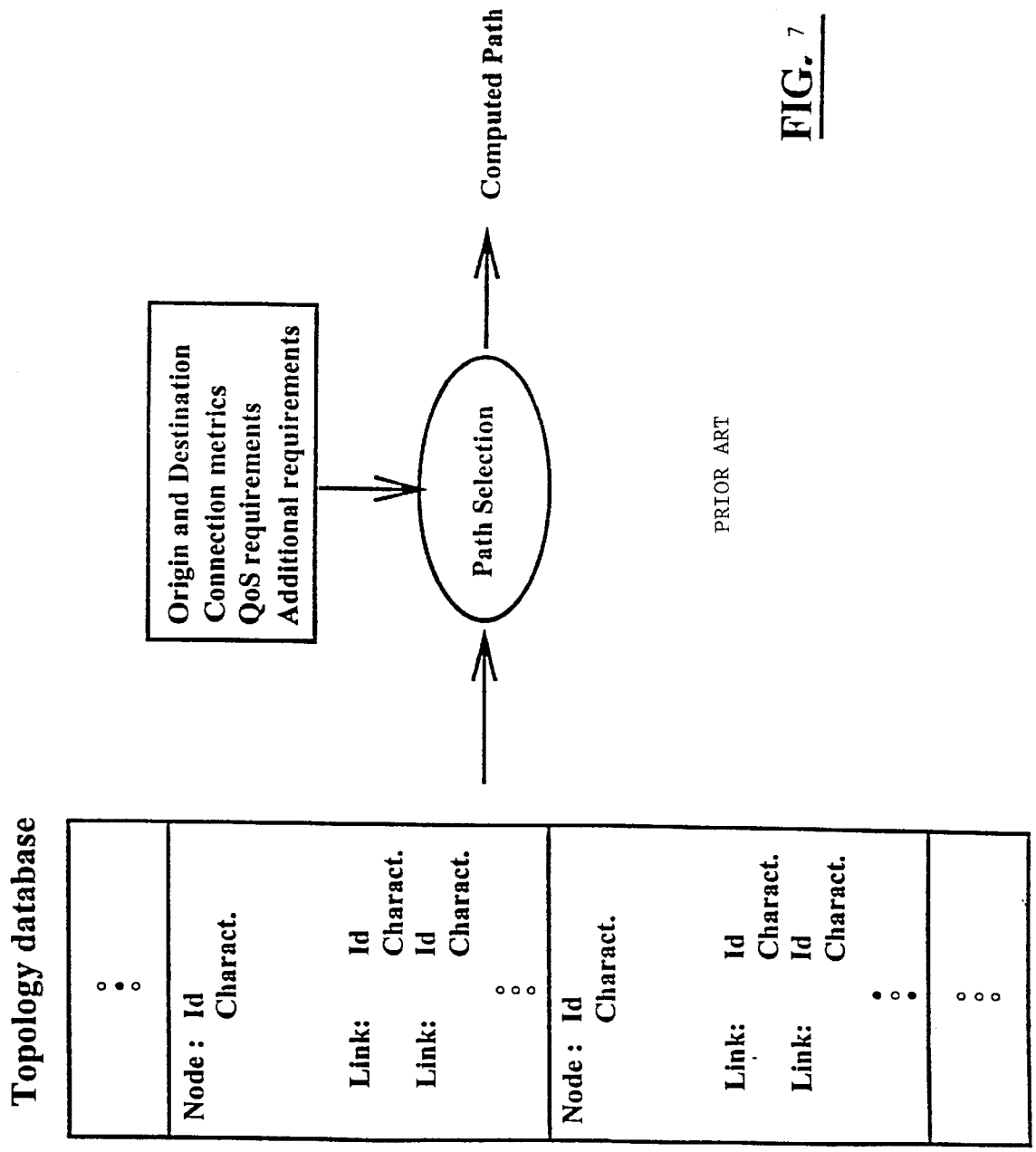
FIG. 7 shows the Path Selection process according to prior art.

Bandwidth Reservation:

The connection set up and bandwidth reservation process, as shown in FIG. 6 comprises the following steps:

Connection Request 101 is specified by the user via a set of parameters including origin and destination network address, and data flow characteristics (bit rate, burstiness).

Path Selection process 102 determines a path and a set of connection requests, one for each link of the path, using parameters provided by the Topology Database.

Bandwidth Reservation process 103 uses the connection requests to reserve bandwidth on each of the links of the path. This process involves exchange of information 109 between the origin (access) node 100, the transit nodes 107 on the path, and the destination node 108.

Bandwidth Reservation 104 replies from transit nodes and end node generate either a call acceptance or a call reject 110.

Link Metric Update process 105 updates, in case of call acceptance, the modified link metrics. This information 111 is sent through the Control Spanning Tree to the Topology Database of each node in the network by means of a broadcast algorithm.

Congestion Control Set Up 106 adjusts, if the call is accepted, the network connection characteristics.

The bandwidth reservation process is performed in the origin and destination nodes by Connection Agents (CA) and by Transit Connection Managers (TCMs) in the transit nodes along the chosen path.

Path Selection

The purpose of the Path Selection process is to determine the best way to allocate network resources to connections both to guarantee that user quality of service requirements are satisfied and also to optimize the overall throughput of the network. The Path Selection process must supply to the requesting user a path over the network over which a point-to-point connection will be established, and some bandwidth will be reserved if needed. As shown in FIG. 6, the Path Selection algorithm uses as input parameters on one hand the user requirements and on the other hand the status of the network links and nodes as maintained in the Topology Database.

The Path Selection process takes place entirely within the node wherein the connection is requested. It makes use of the Topology Database and selects the "best path" based on each of the following criteria in order of importance Quality-of-Service:

The connection's quality-of-service requirements are to be satisfied throughout the life of the connection. There are a large number of variables that determine the performance of a network. However, the quality-of-service can be defined as the set of measurable quantities that describe the user's perception of the service offered by the network. Some of the quality-of service parameters are listed below:
   connection set up delay,
   connection blocking probability,
   loss probability,
   error probability,
   end-to-end transit delay,
   end-to-end delay variation,
   . . .

Some of these quantities have an effect upon how paths are computed, for example the packet loss probability or the end-to-end transit delay: the sum of propagation delays along a computed path may not violate the end-to-end transit delay specifications.

Minimum Hop:

The path shall consist of as few links as feasible to support the connection's quality of service requirements, thus minimizing the amount of network resources as well as processing costs to support the connection. The path computation is based on the links utilization at the time the connection is requested.

Load Balancing:

Among a minimum hop path, a path with "lightly loaded" links is preferred over a path with "more heavily loaded" links based on the network conditions at the time of path selection. The load of a link depends on the customer's criteria: it can be an increasing function of the total reserved bandwidth of the link, proportional to the amount of traffic actually measured on the link, . . . . When the path load (sum of the load of the links over the selected path) is the preponderant criterion of selection, the path of lesser load is chosen.

Bandwidth Management According to Prior Art

The bandwidth management of the NBBS (Networking BroadBand Services) architecture is described as an example of prior art. For simplicity, a single class of service is considered. However, it should be clear that the extension to multi-priorities is straightforward and is covered by NBBS (for more details about NBBS, refer to IBM publication entitled "Networking Broadband Services (NBBS) Architecture Tutorial"—IBM ITSC June 1995 GG24-4486-00).

Connection Metric

Metrics are used to represent network connections with different characteristics. They are obtained from a model that captures the basic behavior of the data source associated with a connection. The behavior of any source can be modeled with a two state model: a source is either idle, generating no data, or active, transmitting data at its peak rate. The bit rate of a connection can therefore be represented by two states, namely: an idle state (transmitting at zero bit rate) and a burst state (transmitting at peak rate). A burst is defined to be a sequence of packets transmitted by the source into the network at its peak rate. The:

- peak rate of a connection,
- distribution of the idle period, and
- distribution of burst length, completely identify the traffic statistics of a connection, assuming the duration of burst and idle periods are exponentially distributed and are not correlated. In this two-state model, a connection i is defined by its metric $c_i=(R_i, m_i, b_i)$, where $R_i$ (in bits per seconds) is the access bit rate (peak bandwidth), $m_i$ (in bits per seconds) is the average bit rate, and $b_i$ (in seconds) is the average burstiness (mean burst duration).

These three parameters are used to specify the bandwidth requirements for the network connection so that the appropriate path can be selected and sufficient bandwidth reserved. Additionally, these parameters are used by the Congestion Control function to monitor conformance of the network connection to its bandwidth reservation.

The variance of the bit rate is $\sigma^2_i = m_i(R_i - m_i)$.

The quantities $m_i$ and $\sigma^2_i$ provide indications of the mean bandwidth requirement, in bits per second, of a network connection and the magnitude of fluctuations around this mean value. The quantity b gives an indication of the duration of transmission bursts generated by the source. For the same utilization, a large b indicates that the source alternates between long burst and idle periods. A small b indicates that data is generated in short alternating burst and idle periods. Two sources with identical mean and peak bit rates but different burst periods, have different impacts on the network. For example, a long burst will have a major impact on queuing points in the network.

Equivalent Capacity

The Equivalent Capacity of a network connection $c_i=(R_i, m_i, b_i)$, is defined as the minimum bandwidth needed on a link to support the connection assuming that no other connections are using the link.

$$\hat{c} = f(R_i, m_i, b_i, x, \varepsilon) = R_i \frac{y_i - X + \sqrt{[y_i - X]^2 + 4X\rho_i y_i}}{2y_i} \quad \text{Equation (1)}$$

where:

X is the size of the buffer where packets are queued while waiting transmission on the trunk line. Large buffer sizes enable bursts of traffic to be handled without packet loss. However, large buffer sizes also enable a larger queuing delay; therefore, the buffer size is usually related to the delay priority associated with a network connection.

$\varepsilon$ is the proportion of packets that can be lost due to the buffer overflowing. This proportion or packet loss ratio objective is dependent on the quality-of-service required by the network connection, and will generally be very small indeed (less than $10^{-6}$).

$y_i = ln(1/\varepsilon)b_i(1-\sigma_i)R_i$, and $\rho_i = m_i/R_i$

In case of a continuous bit stream connection, $\rho_i = 1(m_i = R_i)$, $b_i = \infty$ and $\hat{c}_i = R_i$.

Link Bandwidth Management

A Link Metric vector is a triplet representing the aggregation of all the connections i traversing a link k (in NBBS, several link metrics are defined, corresponding to the different delay priorities, but as mentioned, the simplified assumption of a single class of service per trunk is used). Link Metrics vectors are distributed to other nodes via Topology Database (TDB) update messages. The Equivalent Capacity $\hat{C}_k$ associated with the aggregation of $N_k$ connections established on the link k, combines two characteristics of the traffic of the network:

The bandwidth needed by a single network connection considered separately, a function of its characteristics, system resources and desired quality-of-service.

The impact of statistical multiplexing when many network connections, possibly with different characteristics, are aggregated.

$$L_k = f\left\{M_k = \sum_{i=1}^{N_k} m_i, S_k^2 = \sum_{i=1}^{N_k} \sigma_i^2, \hat{C}_k^{(N_k)} = \sum_{i=1}^{N_k} \hat{C}_i\right\} \quad (2)$$

$$L_k = f\left\{\sum_{i=1}^{N_k} m_i, \sum_{i=1}^{N_k} m_i(R_i - m_i), \sum_{i=1}^{N_k} \hat{C}_i\right\}$$

where the index i runs over the $N_k$ connections already transported on the trunk. Relation (2) can be written:

$$L_k = f\{M_k, S_k^2, \hat{C}^{k(Nk)}\} \quad (3)$$

where:

$$M_k = \sum_{i=1}^{N_k} m_i;$$

sum of the mean of bit rates=mean of the aggregate bit rate, $$S_k^2 = \sum_{i=1}^{N_k} m_i(R_i - m_i);$$

sum of the variances of the bit rates=variance of the aggregate bit rate, $$\hat{C}_k^{(N_k)} = \sum_{i=1}^{N_k} \hat{C}_i$$

sum of the individual Equivalent Capacities of all the $N_k$ connections established on the link k.

The current level of reservation of the link k is given by:

$$\hat{C}_k^1 = \min\left\{\sum_{i=1}^{N_k}(m_i + \alpha\sigma_i), \sum_{i=1}^{N_k}\hat{C}_i\right\} = \min\{(M_k + \alpha S_k), \hat{C}_K^{(N_k)}\} \quad (4)$$

with:

$$\alpha \simeq \sqrt{2\ln\frac{1}{\varepsilon} - \ln 2\pi},$$

Equation (4) provides a reasonably accurate estimate of the capacity required to support a given set of network connections.

The first function ($M_k + \alpha S_k$) relies on a Gaussian approximation to characterize the aggregate bit rates of all connections routed over a link k. This model captures the stationary behavior of aggregate bit rate and provides a good estimate for cases where many connections have long burst periods and relatively low utilization. In such cases, individual network connections often require close to their peak, while the stationary behavior of their aggregation indicates that much less in fact needed. The Gaussian assumption, however implies that the model may be inaccurate when used with a small number of high peak rate network connections.

The second function (sum of the individual equivalent capacities obtained for equation (1)) captures the impact of source characteristics, in particular the duration of the burst period, on the required bandwidth. This result is substantial capacity savings when the duration of the burst period is small.

From equation (4), it is seen that the equivalent capacity can be easily updated as new connections are added or removed, provided that the total mean and variance of the bit rate and the sum of all individual equivalent capacities are kept.

Path Selection

Bandwidth request messages for routing new connections ($R_i$, $m_i$, $b_i$) and updating accordingly the Link Metric vectors, contain a request vector defined by:

$$r_i = (m_i, \sigma_i^2, \hat{c}_i)$$

Note: The access bit rate (peak bandwidth) $R_i$ is derived from this request vector $r_i$ by means of the expression:

$$R_i = m_i + \frac{\sigma_i^2}{m_i}$$

A Path Selection algorithm—a variant of the Bellman-Ford algorithm in a preferred embodiment—is then executed. The algorithm screens the network links which are defined in the Topology Database (TDB). For each link examined as a candidate for being part of the path, the Path Selection:

1. Computes the Equivalent Capacity $\hat{C}_i$ of the Connection i Over This Link Using Relation (1).
2. Determines Whether the Connection is Multiplexible or not The Path Selection computes $t_1 = C_k^0 - N^x m_i$ and $t_2 = \alpha^2 N^x \sigma_i^2$, where:

$C_k^0$ represents the link reservable bandwidth, and $N^x$ is a constant specifying the minimum number of connections needed by the Gaussian assumption.

3. Estimates the Link Metric $L'_k$ if the New Connection is to be Added

Two cases must be distinguished, depending on the potential impact of the network connection on the link; the need for these two cases arises from the form of the equation (4). More specifically, the assumption that the aggregate bit rate has a Gaussian distribution is valid only if a sufficient number of connections can be multiplexed on the link. For any given type of connection, this depends on both the connection characteristics and the total link bandwidth.

If $t_1 > 0$ and $t_2 < t_1^2$ then the connection is multiplexible, and the Gaussian approximation is used:

$$L'_k = L_k + r_i = L_k + (m_i, \sigma_i^2, \hat{c}_i) = \{M'_k, S'^2_k, \hat{C}'^{(N_{k+1})}_k\} \quad (5)$$

where addition is component-wise.

Else, the connection is not multiplexible, and the Equivalent Capacity must be reserved on the link:

$$L'_k = L_k + \tilde{r}_i = L_k + (\hat{C}_i, 0, \hat{C}_i) = \{M'_k, S'^2_k, \hat{C}'^{(N_{k+1})}_k\} \quad (6)$$

Equation (6) simply states that network connections for which the Gaussian assumption does not hold are treated as constant bit rate connections ($\sigma_1^2 = 0$) with rate equal to their equivalent capacity as given by equation (1). From the updated Link Metric vector, the new allocated equivalent bandwidth is easily computed using again equation (4).

4. Checks the Link Eligibility

The ability of the link to handle the new connection is then checked. The bandwidth which would be reserved on the link after the new connection has been accepted on this link is equal to:

$$\hat{C}_k^2 = \min\{(M'_k + \alpha S'_k), \hat{C}'^{(N_{k+1})}_k\} \quad (7)$$

where the $(M'_k, S'^2_k, \hat{C}'^{(N_k+1)}_k)$ values denote the components of the Link Metrics as updated by relations (5) or (6). The link is able to handle the new connection if:

$$\hat{C}^2_k \leq C^0_k \qquad (8)$$

5. Computes the Load Balancing Weight of the Link

If the link k is eligible, the link ability to support the new connection is estimated by the load balancing weight of the link:

$$W_k = \frac{C^0_k}{(C^0_k - \hat{C}^1_k)(C^0_k - \hat{C}^2_k)} \qquad (9)$$

where:

$\hat{C}^1_k$ is computed from relation (4) and represents the bandwidth currently reserved on the link k not taking the requesting connection into account.

$\hat{C}^2_k$ represents the bandwidth that will be reserved on the link k if the link is chosen to carry the requesting connection.

$C^0_k$ is the total capacity of the link k.

This Link Weight $w_k$ is then used in the Path Selection algorithm to properly insure load balancing in the network.

Connection Establishment

Once a path has been selected in the network, the Connection Agent (CA) in origin node prepares a connection set-up message and sends it over the path, with a copy to every Transit Connection Manager (TCM) in transit nodes and to the destination Connection Agent (CA). Among other information, the connection set-up message includes:

the parameters $(m_i, \sigma_i^2, b_i)$ of the new connection i (the Connection Metric $c_i=(R_i, m_i, b_i)$ can be derived from $(m_i, \sigma_i^2, b_i)$)

the triplets $(X_k, \epsilon_k, \hat{c}_{i,k})$ for each link k of the path.

Transit Connection Manager (TCM)

Upon receiving the connection set-up message, the Transit Connection Manager (TCM) of link k executes several verifications, including bandwidth management. The TCM:

1. Extracts from the received triplets $(X_k, \epsilon_k, \hat{c}_{i,k})$ the Equivalent Capacity $\hat{c}_{i,k}$ of the connection. To do so, the Transit Connection Manager (TCM) correlates the $(X_k, \epsilon_k, \hat{c}_{i,k})$ values of the triplets with its own $(X_k, \epsilon_k)$ values.
2. Determines whether the connection is multiplexible or not, according to step 2 described above in the Path Selection section.
3. Estimates the Link Metric $L_k$ the new connection is to be added using relations (5) and (6).
4. Determines the link eligibility using relations (7) and (8).
5. If the link is eligible, grants the bandwidth to the origin Connection Agent (CA), and updates the Link Metrics $L_k$ according to relations (5) and (6). The TCM eventually broadcasts the new values.

Bandwidth Management According to the Present Invention

The object of the present invention is to establish new connections in the network while taking into account the dependence of these connections on other connections originated in the same port. For simplicity, a single class of service is considered. It should be clear that the extension to multi-priorities is straightforward. The Dependent Connection Bandwidth Management process according to the present invention is based on:

1. An accounting of all connections established on every link in the network,
2. A modification of the path selection algorithm,
3. A modification of the connection set-up message, and
4. A modification of the Transit Connection Manager (TCM) algorithms.

Port Accounting

Figure 8:
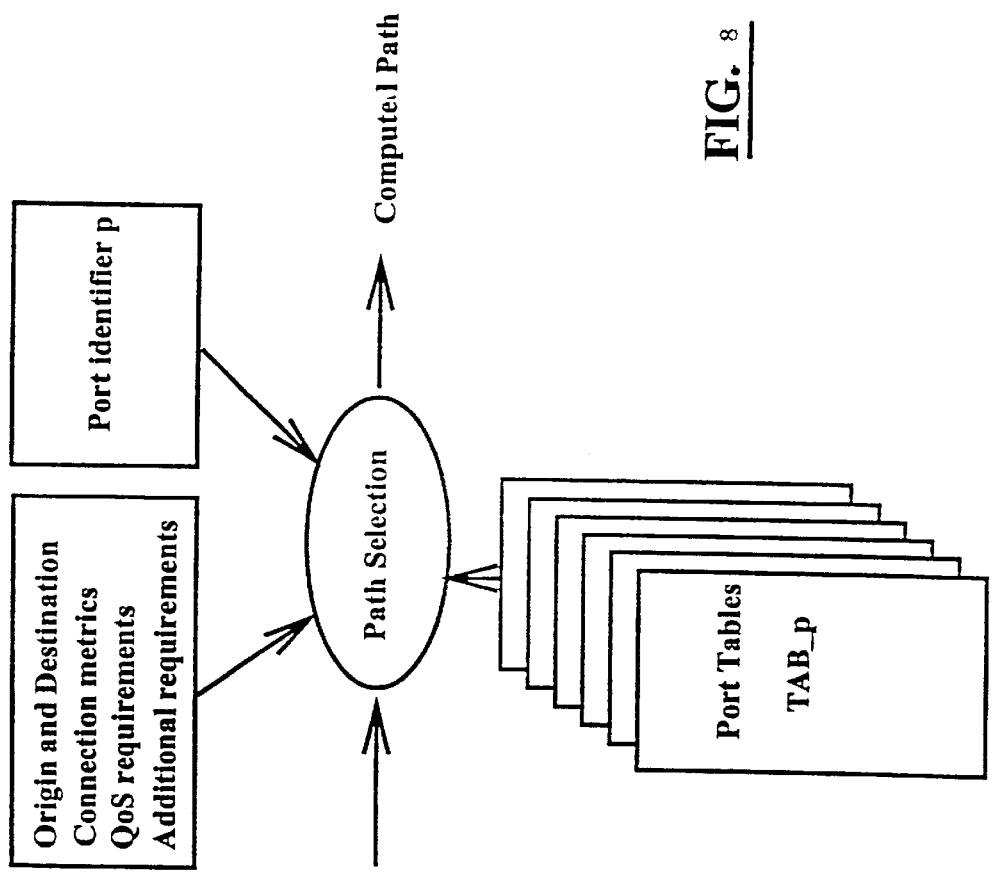
FIG. 8 shows the Path Selection process for dependent connections according to the present invention.

In the Route Controller of each node, a set of tables is defined, one for each port of the node. In particular for each prot p a Dependent Connection Table $DCT_p$ as shown in FIG. 8, is maintained. This table comprises an entry for each link in the network and each entry includes the information required to manage the bandwidth of the link and the dependency of the port connections. The entry k of table $DCT_p$ corresponds to link k, and includes a quadruplet:

$$DCT_p(k)=\{1_k, M_k, B_k, E_k^{(N_k)}\} \qquad (10)$$

$DCT_p$ is called "Dependent Connection Table attached to port p".

$1_k$ is a boolean.

If $1_k=1$, then a "Dependent Connection Bandwidth Management" (DCBM) according to the present invention can be used on link k.

Else, the bandwidth management according to prior art (NBBS) is used.

$M_k$ represents the mean bit rate of the aggregation of the $N_k$ connections i issued from port p and using link k:

$$M_k = \sum_{i=1}^{N_k} m_i \qquad (11)$$

$B_k$ represents the mean burst duration of the aggregation of the $N_k$ connections i issued from port p and using link k:

$$B_k = \frac{\sum_{i=1}^{N_k} m_i \times b_i}{\sum_{i=1}^{N_k} m_i} \qquad (12)$$

$E_k^{(N_k)}$ the Equivalent Capacity required on link k by the aggregation of the $N_k$ connections issued from port p and using link k:

$$E_k^{(N_k)}=f(R, M_k, B_k, X, \epsilon) \qquad (13)$$

where the function $f$ is given by relation (1).

$$E_k^{(N_k)} = R\frac{Y_k - X + \sqrt{[Y_k - X]^2 + 4X\rho_k Y_k}}{2Y_k}$$

Where:

R is the port access rate, $Y_k=\ln(1/\epsilon)B_k(1-\rho_k)R$, and $\rho_k=M_k/R$.

The following observations can be made

1. The Equivalent Capacity $E_k^{(N_k)}$ for the aggregation of the $N_k$ connections issued from port p and transported on link k, is always less than the sum of the individual equivalent capacities of the $N_k$ connections.

$$E_k^{(N_k)} \leq \hat{C}_k^{(N_k)} = \sum_{i=1}^{N_k} \hat{C}_i$$

The equality occurs when a single connection ($N_k=1$) is issued from port p on link k.

2. The variance $V^2_k$ of the bit rate of the aggregation of the $N_k$ connections issued from this port p and transported on link k defined by:

$$V_k^2 = M_k(R-M_k) \qquad (14)$$

is always less than the sum of the variances of the bit rate of the $N_k$ connections issued from this port p and transported on link k:

$$V_k^2 \leq S_k^2 = \sum_{i=1}^{N_k} \sigma_i^2$$

Path Selection

The Dependent Connection Bandwidth Management (DCBM) modifies the Path Selection process as explained hereunder. For each link k examined as a candidate for being part of the path, the computations and verification take into account the entries in the Dependent Connection Table $DCT_p(k)$, and a boolean $I_{dcbm}$ initialized to "1" at the beginning of the path search:

If $I_{dcbm}$ AND $I_k=1$ then the Dependent Connection Bandwidth Management (DCBM) is used as detailed below.

Else, the bandwidth management according to prior art (NBBS) is used.

As the result of each iteration, a link k_select is selected, and the boolean $I_{dcbm}$ is updated:

$$I_{dcbm} = I_{dcbm} \text{ AND } I_{k\_select}$$

The algorithm is executed for each link k if $I_{dcbm}$ AND $I_k=1$. The Path Selection process comprises the steps of:

1. Computing the Equivalent Capacity $E'^{(N_k+1)}_k$ required on link k when the additional connection i with metric ($R_1$, $m_1$, $b_1$) is added to the aggregation of the $N_k$ connections issued from port p and already established on link k:

$$E'^{(N_k+1)}_k = f(R, M'_k, B'_k, X, \epsilon) \qquad (15)$$

where $$M'_k = M_k + M_i$$

$$B'_k = \frac{m_i x b_i + \sum_{j=1}^{N_k} m_j x b_j}{m_i + \sum_{j=1}^{N_k} m_j} = \frac{m_i x b_i + B_k M_k}{m_i + M_k}.$$

2. Devriving the increase of the Equivalent Capacity $\Delta Ek$ required to transport the additional connection:

$$\Delta E_k = E'^{(N_k+1)}_k - E_k^{(N_k)}$$

Note: $\Delta E_k$ is always less than or equal to the Equivalent Capacity $\hat{c}_i$ of the new connection i:

$$\Delta E_k \leq \hat{c}_i = f(R_i, M_i, b_i, X, \epsilon)$$

Note: if link k does not transport other connections issued from port p ($M_k = B_k = 0$), then $\Delta E_k$ is equal to $\hat{c}_i = f(R_k, m_i, b_i, X, \epsilon)$.

3. Computing the increase of the variance of the bit rate $\Delta V^2_k$ of the aggregation of the ($N_k+1$) connections issued from port p and transported on link k:

$$\Delta V^2_k = (M_k + m_i)(R - (M_k + m_i)) - V_k = m_i(R - 2M_k - m_i)$$

$$\Delta V^2_k = \sigma_i^2 - 2m_i M_k$$

Notes:

$\Delta V^2_k$ is always less than or equal to the variance of the bit rate of the connection which is established:

$$\Delta V^2_k \leq \sigma^2.$$

If link k does not transport other connections issued from port p, then $\Delta V^2_k$ is equal to σ.

4. Determining whether the connection is multiplexible or not:

$$t_1 = C_0 N^x m \text{ and } t_2 = \alpha^2 N^x \Delta V^2_k \text{ are computed where:}$$

$C_0$ represents the link reservable bandwidth, and $N^x$ is a constant that specifies the minimum number of connections needed by the Gaussian assumption.

5. Estimating the Link Metric if the New Connection was to be Added:

If $t_1 > 0$ and $t_2 < t_1^2$ the connection is multiplexible, and the Gaussian approximation is used:

$$L'_k = L_k + (m_i, \Delta V_k^2, \Delta E_k) = \{M'_k, a\,V'_k, E'^{(N_k+1)}_k\} \qquad (18)$$

where addition is component-wise.

Else, the connection is not multiplexible, and the Equivalent Capacity must be reserved on the link:

$$L'_k = L_k + (\Delta E_k, 0, \Delta E_k) = \{M'_k, V'^2_k, E'^{(N_k+1)}_k\} \qquad (19)$$

6. Checking the Link Eligibility

The bandwidth which would be reserved on the link after the new connection has been accepted on this link is:

$$\hat{C}_k^2 = \min\{(M'_k, \alpha.V'_k, E'^{(N_k+1)}_k)\}$$

where the ($M'_k$, $V'^2_k$, $E'^{(N_k+1)}_k$) values denote the components of the Link Metrics as updated by relations (18) or (19):

$$\hat{C}_k^2 = \min\{(M_k + m_i) + \alpha\sqrt{(V_k^2 + \Delta V_k^2)}, (E_k^{(N_k+1)} + \Delta E_k)\} \qquad (20)$$

The link is able to handle the new connection if:

$$\hat{C}_k^2 \leq C_k^0 \qquad (21)$$

7. Computing the Load Balancing Weight of the Link

If the link k is eligible, the link ability to support the new connection is estimated by the load balancing weight of the link:

$$W_k = \frac{C_k^0}{(C_k^0 - \hat{C}_k^1)(C_k^0 - \hat{C}_k^2)} \quad (22)$$

where:

$\hat{C}_k^1$ is computed from relation (4) and represents the bandwidth currently reserved on link k not taking the requesting connection into account.

$\hat{C}_k^2$ represents the bandwidth that will be reserved on link k if the link is chosen to carry the requesting connection.

$\hat{C}_k^0$ is the total capacity of link k.

Connection Establishment

Among other information, the connection set-up message includes:

the connection metric of the new connection i:

$$(m_i, \sigma_i^2, b_i) \quad (23)$$

a quintet for each link k of the path:

$$(x_k, \epsilon_k, l_k, \Delta E_k, \Delta V_k) \quad (24)$$

Transit Connection Manager (TCM)

Upon receiving the connection message, the Transit Connection Manager (TCM) assoicated with link k first tests the Boolean $I_k$ If $I_k=0$, the Transit Connection Manager (TCM) executes the bandwidth management algorithms according to prior art (NIBBS) as previously detailed.

If $I_k=1$, the Transit Connection Manager (TCM) executes the Dependent Connection Bandwidth Management (DCBM) algorithms. In particular, the TCM:

1. Extracts from the receive quintets the increase in Equivalent Capacity $\Delta E_k$ and the increase in variance $\Delta V_k^2$ due to the new connection. To do so, the Transit Connection Manager (TCM) correlates the $(X_k, \epsilon_k, \Delta E_k, \Delta V_k^2)$ values of the quintet with its own $(X_k, \epsilon_k)$ values.
2. Determines whether the connection is multiplexible or not, according to step 2 described above in Path Selection section.
3. Estimates the Link Metric if the new connection is to be added using relations (18) and (19).
4. Determines the link eligibility using relations (20) and (21).
5. If the link is eligible, grants the bandwidth to the origin Connection Agent (CA), and updates the Link Metrics using relations (18) and (19). The TCM eventually broadcasts the new values.

Coincident Paths

Figure 9:
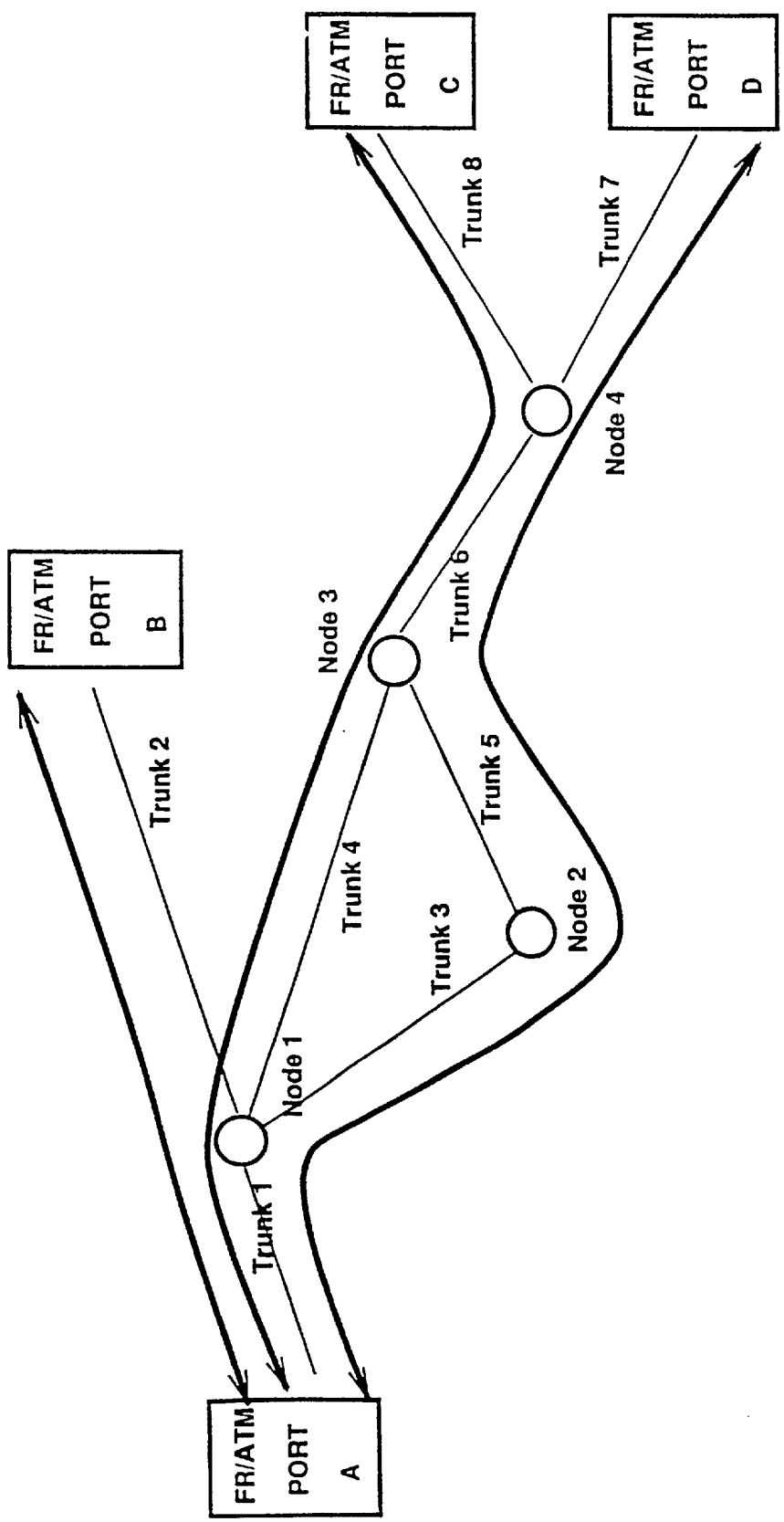
FIG. 9 shows a coincident path issue.

As previously mentioned, the Dependent Connection Bandwidth Management (DCBM) algorithms are enabled thanks to a Boolean $I_k$ defined for each link k stored in the Topology Database (TDB) within each network node. This Boolean has a local value, which means that, for a given link k, it can take different values in different nodes. In fact, the parameter $I_k$, is used to address "coincident path situations". FIG. 9 shows a complex network. Compared to FIG. 4, the connection from port A to port B is still using Trunk 1 and Trunk 2. However, the two connections from port A to port C and from port A to port D, are now sharing Trunk 1 and Trunk 6. The paths taken by these connections separate at Transit Node 1, and then merge at Transit Node 3. Since these connections encounter a different delay between Transit Node 1 and Transit Node 3, one can no longer make the assumption of dependent connections. Burst may occur at the same time on trunks common to both connections. This problem can be solved thanks to the link parameter $I_k$.

Disconnected Trees

Figure 10:
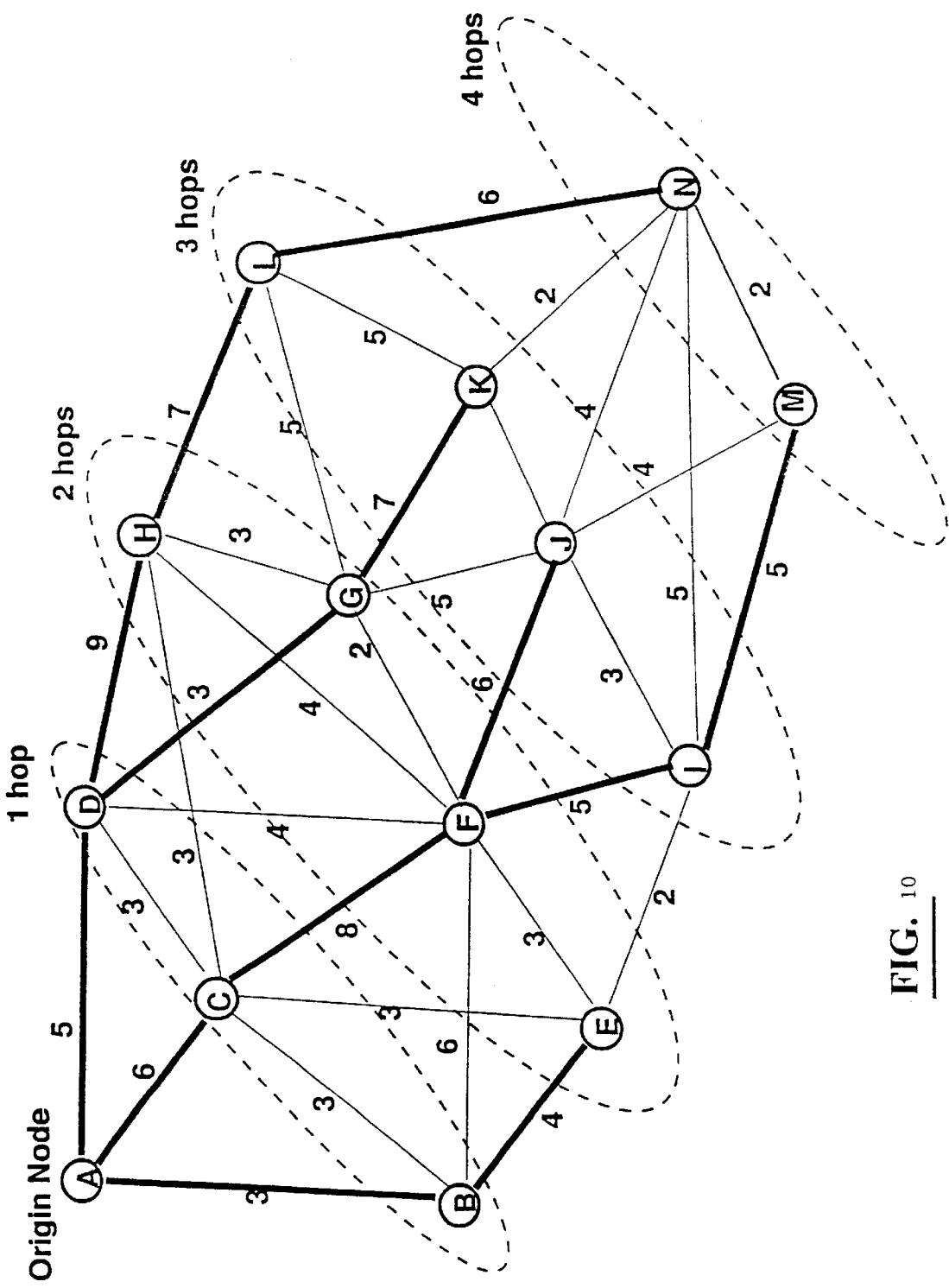
FIG. 10 represents disconnected trees obtained at origin node A.

FIG. 9 shows that the dependency of connections A-C and A-D is broken on Trunk 6, where the paths merge. Based on this observation, it is possible to pre-mark each link of the network in order to disable the Dependent Connection Bandwidth Manager (DCBM) algorithms once the coincident path situation is encountered during the execution of the path selection algorithm. The link pre-marking is based on the definition of disconnected trees, which span all the nodes of the network, as shown on FIG. 10 (numbers denote links bandwidth). Disconnected trees are determined by the algorithm described hereunder. Given an origin node (e.g. node A in FIG. 10), trees are built in an iterative way.

1. The input to iteration N is the set of nodes located at a distance of N hops from the origin node.
2. The output of iteration N is the set of nodes located at a distance of (N+1) hops from the origin node, and the set of links—one link per node of the output set—, that link the input set to the output set.

The algorithm starts with the origin node A, and looks at all the nodes connected to the origin node. For each of these nodes, the algorithm selects the link with the largest rate and that connects it to one of the nodes at the origin node. For example:

1. At iteration 1 (see FIG. 10), three nodes (B, C, D) are examined, and all links issued from A are selected.
2. At iteration 2, the set of nodes located at 2 hops from A is examined (nodes E, F, G, H). As far as node E, link E-B is preferred to link E-C because of its higher bandwidth. Similarly for nodes F, G, and H, links F-C, G-D, and H-D are selected.

Figure 11:
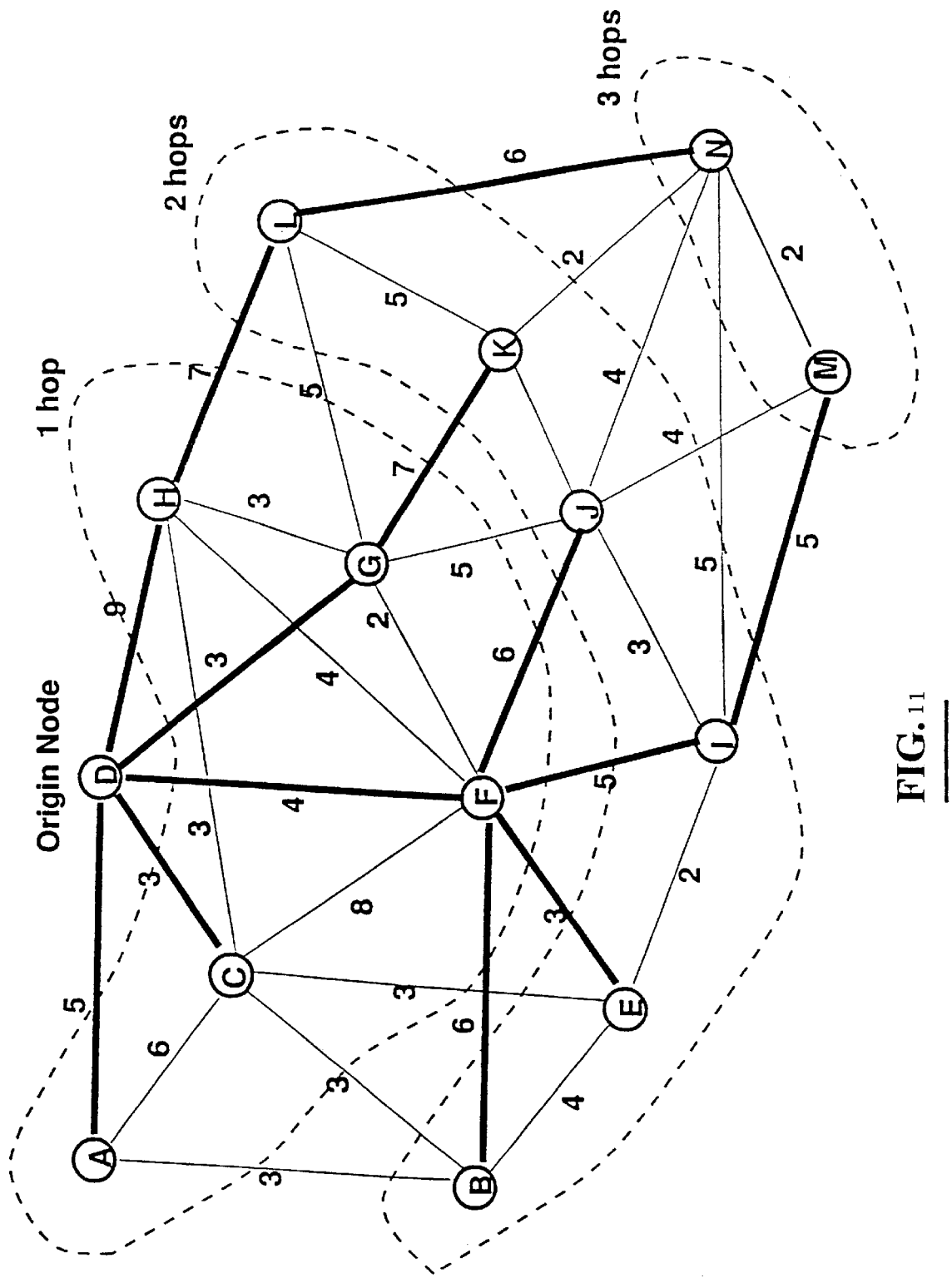
FIG. 11 represents disconnected trees obtained at origin node D.

Once the trees have been built, each link on each tree is marked with a link parameter $I_k=1$, and the remaining links in the network are marked with $I_k=0$. The link parameter is then used in the DCBM algorithm. The link marking is represented by bold lines in FIG. 10. As already mentioned, the marking is generally different in each node. For example, FIG. 11 represents the trees that would be obtained at origin node D (numbers denote links bandwidths).

Bandwidth Saving

Figure 4:
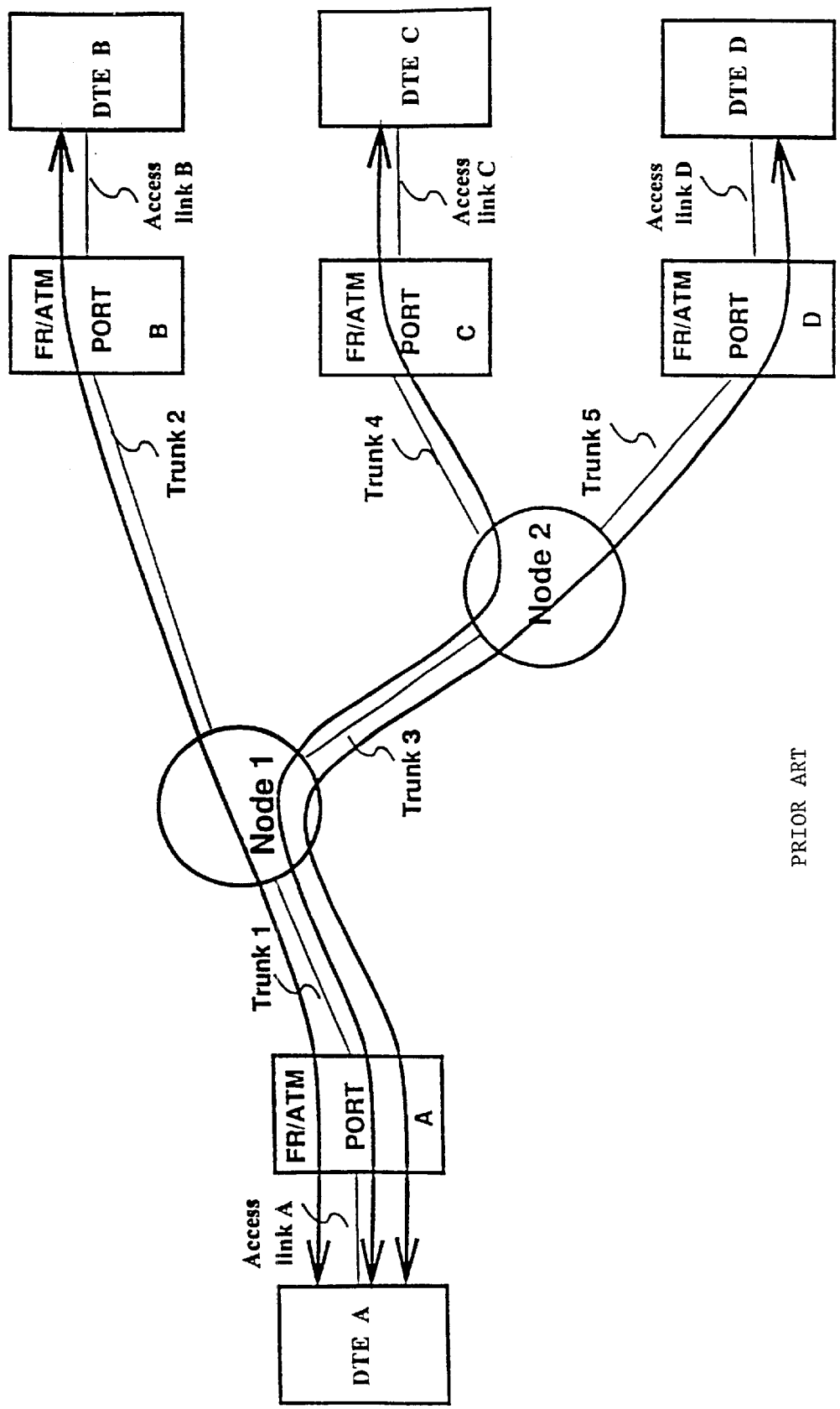
FIG. 4 shows a typical prior art Frame Relay/ATM network.

Referring back to the example illustrated in FIG. 4, it is possible to evaluate the bandwidth saving on each trunk. The table below compares the amount of bandwidth which is reserved on each trunk using:

1. The bandwidth manager according to prior art (NBBS), and
2. The Dependent Connection Bandwidth Manager (DCBM) according to the present invention.

| Trunk id | Number of DLCI's on Trunk | Amount of bandwidth reserved by NBBS (kbps) | Amount of bandwidth reserved by DPCM (kbps) |
|---|---|---|---|
| Trunk 1 | 3 | 2100 | 1173 |
| Trunk 2 | 1 | 700 | 700 |
| Trunk 3 | 2 | 1400 | 958 |
| Trunk 4 | 1 | 700 | 700 |
| Trunk 5 | 1 | 700 | 700 |

This simple example shows that the increase in reserved bandwidth for establishing several dependent connections having the same characteristics, is decreasing with the number of connections. The asymptotic behavior can be seen on FIG. 12. The amount of bandwidth reserved on a single trunk to transport a given number of dependent connections is compared using:

1. The bandwidth management algorithms according to prior art (NBBS), and
2. The Dependent Connection Bandwidth Management (DCBM) algorithms according to the present invention.

Figure 13:
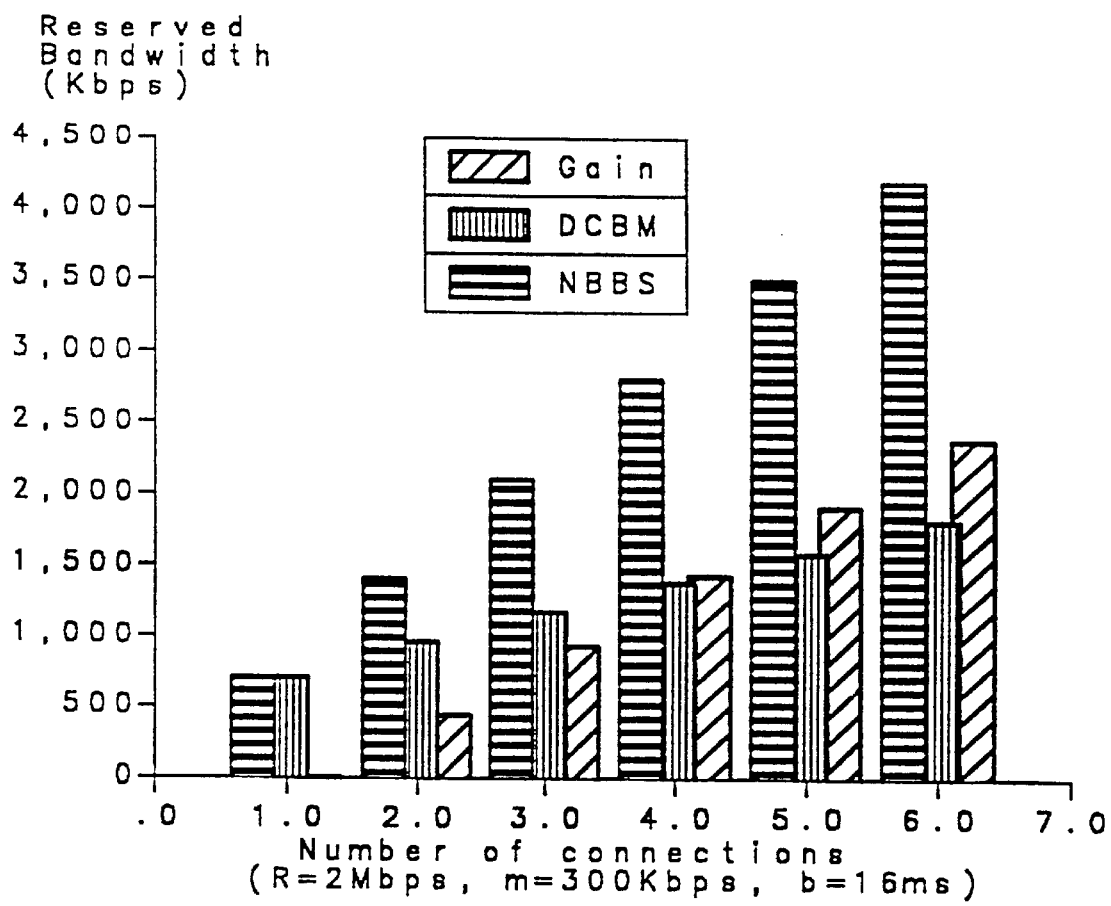
FIG. 13 shows the reserved bandwidth as a function of the number of connections according to the prior art and the present invention.

FIG. 13 shows also the gain of the Dependent Connection Bandwidth Management (DCBM) over the prior art (NBBS). The connections are issued from a low speed port at access rate R=2 Mbps, and have all the same characteristics m=300 kbps, and b=16 ms corresponding to a committed burst length equal to $$B_c = \frac{b \times R}{8 \text{ bits}} = 4 \text{ kbytes}$$

Note: $B_c$ and CIR are standard parameters for Frame Relay (refer to Frame Relay core aspects ANSI T1.618-1991 and ITU-T Q.922 Annex A).

With a bandwidth management according to prior art (NBBS), the amount of reserved bandwidth grows linearly, while with the Dependent Connection Bandwidth Management (DCBM), the bandwidth reservation is bounded by the port speed. More generally, the gain achieved by the present invention over the prior art (NBBS) is function of the connection metric. Let's assume that a port with access rate R carries N identical connections with mean rate m=R/N. If $C_{nbbs}$ denotes the amount of bandwidth reserved by NBBS to carry the N connections on a single trunk, and $C_{dcbm}$ denotes the amount of bandwidth reserved by the Dependent Connection Bandwidth Management (DCBM) to do the same job, the gain is defined by the ratio:

$$Gain = \frac{C_{nbbs}}{C_{dcbm}}$$

Figure 12:
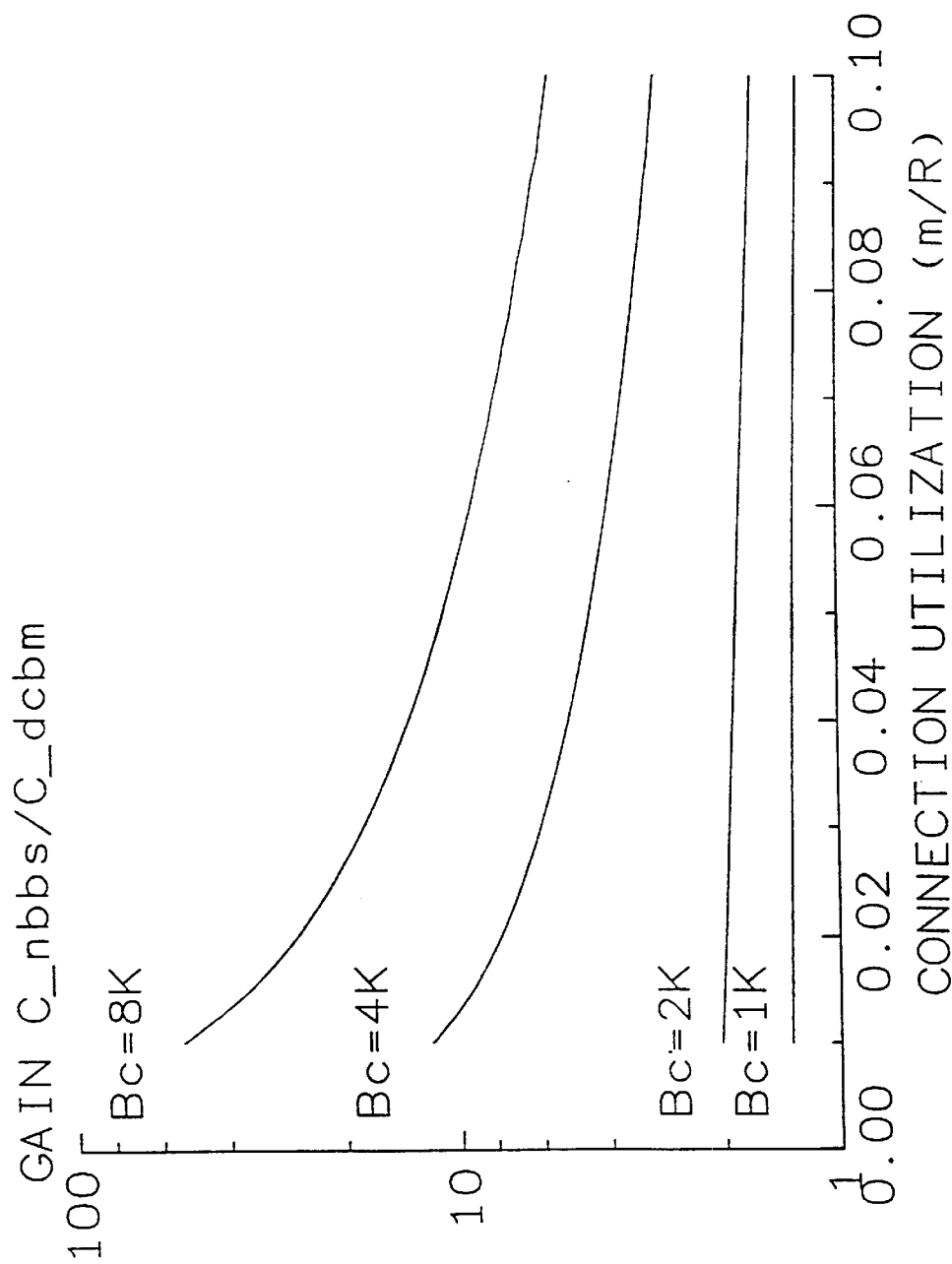
FIG. 12 is a graph showing the connection utilization and the gain of bandwidth reservation resulting from the present invention.

FIG. 12 shows the variations of this gain as a function of the mean connection bit rate normalized to the port rate m/R, and for four values of the committed burst size ($B_c$=1, 2, 4, and 8 kbytes). One can see that a significant gain can be achieved for bursty connections. For example, if a 52 Mbps Frame Relay port (Access Rate R=52 Mbps) generates 50 identical connections with 1 Mbps mean rate (Committed Information Rate CIR=Mbps) and 0.6 ms average burst duration ($B_c$=4 kbytes), and if these connections share the same trunk, then the bandwidth reservation on this trunk could be lowered by a factor 8, when using the Dependent Connection Bandwidth Management (DCBM) instead of prior art bandwidth management (NBBS).

Ring Topology

Figure 14:
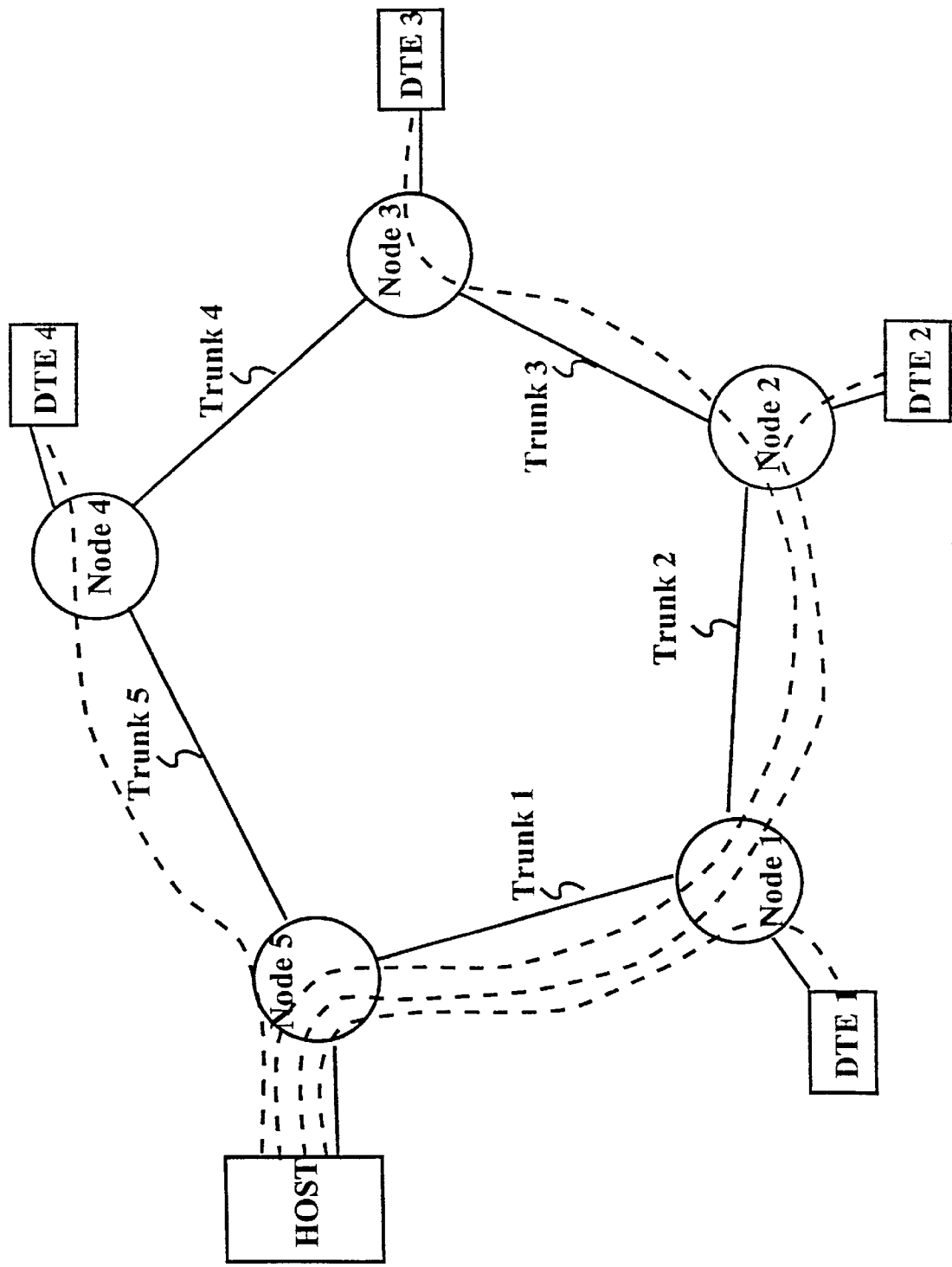
FIG. 14 shows a ring network where all connections issuing from the same port are dependent.

A case that perfectly fits with the trees proposal is the ring topology described in FIG. 14. By essence, all connections that flow on a given trunk, and that are issued from the same port, are dependent. The ring topology is important since it appears de facto in many networks constrained by physical laws (fiber along railways, or electrical power distribution networks, etc . . . ). For illustration purpose, FIG. 14 represents five nodes connected by five trunks—Trunk 1 to Trunk 5—in a ring topology. A host is attached to a Frame Relay port at Node 5, and has established Frame Relay connections to Digital Terminal Equipment 1, 2, 3 and 4 (DTE 1, DTE 2 DTE 3, and DTE 4), which are attached to Frame Relay ports respectively at Node 1, Node 2, Node 3, and Node 4. (These connections are shown by dashed lines on FIG. 14).

It is clear that for a ring topology, the tree is the ring itself, and that no coincident path exists. Therefore, the gain in bandwidth saving is maximum on all trunks. For example, let's consider Trunk 1 which carries three connections from Host to Digital Terminal Equipment 1, 2, 3 (DTE 1, DTE 2, and DTE 3). Assuming that all connections are defined with the same bandwidth reservation, say 700 kbps, then only 1173 kbps needs to be reserved on Trunk 1. The prior art would have required to reserve 3×700=2100 kbps on Trunk 1.

Conclusion

The object of the present invention is to optimally share a reserved bandwidth on a trunk between several connections issued from the same port. The Dependent Connection Bandwidth Management (DCBM) exploits the dependent connection property of virtual logical connections, which demonstrates that it is not necessary to reserve more bandwidth than the port access rate.

Numerical examples on partial ring topologies, as they exist in networks under deployment, have demonstrated that the claimed method and system can achieve significant bandwidth savings.

The Dependent Connection Bandwidth Management (DCBM) reduces the bandwidth required in the backbone network, while still guaranteeing an end-to-end quality-of-service. Pure statistical multiplexing technique can result in even less bandwidth in the backbone network, however the quality-of-service is no more guaranteed. Therefore, the Dependent Connection Bandwidth Management (DCBM) should be considered as a complementary extension to the bandwidth management according to the prior art (NBBS), which reduces the bandwidth requirement close to a pure statistical multiplexing solution while still maintaining the quality-of-service.

The present invention is not limited to a specific protocol such as Frame Relay (FR) but can be used to improve any service offering that uses a shared access medium, like ATM.

What is claimed is:

1. In a high a speed packet switching network, a plurality of nodes interconnected with transmission trunks including links, each node having at least one physical port, a dependent connection bandwidth management system for sharing reserved bandwidth between several dependent connections issuing from the same physical port in a node accessing the network, comprising:

a. means for accounting for all connections established on every link in the network;

b. means for examining each link as a candidate for being part of a selected path through the network for connecting a port to the network;

c. means for generating a connection message for connecting a port to the network; and d. means for managing the links in accordance with the connection message and a link parameter to reserve on a trunk an aggregate bandwidth for all connections issuing from the same physical port if the path from the access node to the trunk is common to all connections.

2. The dependent connection bandwidth management system of claim 1 further comprising:

(a) means for establishing new connections originated by a port in the network while taking into account the dependence of such new connections with other connections originated in the same port.

3. The dependent connection bandwidth management system of claim 1 further comprising:

(a) means for establishing a Dependent Connection table $DCT_p$ for each port of a node, the table comprising an entry for each link in the network and information required to manage the bandwidth of the link and the dependency of the port connections.

4. In a dependent connection bandwidth management system in a high speed packet switching network including a plurality of nodes interconnected with transmission trunks including links, each node having at least one physical port, a method for sharing reserved bandwidth between several dependent connections issuing from the same physical port in a node accessing the network, comprising the steps of:

a. accounting for all connections established on every link in the network;

b. examining each link as a candidate for being part of a selected path through the network for connecting a port to the network;

c. generating a connection message for connecting a port to the network; and d. managing the links in accordance with the connection message and a link parameter to reserve on a trunk an aggregate bandwidth for all connections issuing from the same physical port if the path from the access node to the trunk is common to all connections.

5. The method of claim 4 further comprising the step of:

(a) establishing new connections originated by a port in the network while taking into account the dependence of such new connections with other connections originated in the same port.

6. The method of claim 5 further comprising the step of:

(a) establishing a Dependent Connection table $DCT_p$ for each port of a node, the table comprising an entry for each link in the network and information required to manage the bandwidth of the link and the dependency of the port connections.

7. In a high a speed packet switching network, a plurality of nodes interconnected with transmission trunks including links, each node having at least one physical port, a dependent connection bandwidth management system for sharing reserved bandwidth between several dependent connections issuing from the same physical port in a node accessing the network, comprising:

a. means for accounting for all connections established on every link in the network;

b. means for examining each link as a candidate for being part of a selected path through the network for connecting a port to the network;

c. means for generating a connection message for connecting a port to the network;

d. means for managing the links in accordance with the connection message and a link parameter to reserve on a trunk an aggregate bandwidth for all connections issuing from the same physical port if the path from the access node to the trunk is common to all connections;

e. means for establishing a Dependent Connection table $DCT_p$ for each port of a node, the table comprising an entry for each link in the network and information required to manage the bandwidth of the link and the dependency of the port connections;

f. means for establishing in the $DCT_p$ a bandwidth management boolean factor $I_k$ for each link;

g. means for setting the boolean factor to select between defined bandwidth for each dependent connection or aggregate bandwidth for all connections; and h. means for setting the boolean factor $I_k$ equal to 1 for selecting aggregate bandwidth for all connections or setting the boolean factor $I_k$ equal to 0 for selecting defined bandwidth for all connections.

8. In a dependent connection bandwidth management system in a high speed packet switching network including a plurality of nodes interconnected with transmission trunks including links, each node having at least one physical port, a method for sharing reserved bandwidth between several dependent connections issuing from the same physical port in a node accessing the network, comprising the steps of:

a. accounting for all connections established on every link in the network;

b. examining each link as a candidate for being part of a selected path through the network for connecting a port to the network;

c. generating a connection message for connecting a port to the network;

d. managing the links in accordance with the connection message and a link parameter to reserve on a trunk an aggregate bandwidth for all connections issuing from the same physical port if the path from the access node to the trunk is common to all connections;

e. establishing a Dependent Connection table $DCT_p$ for each port of a node, the table comprising an entry for each link in the network and information required to manage the bandwidth of the link and the dependency of the port connections;

f. establishing the $DCT_p$ a bandwidth management boolean factor $I_k$ for each link;

g. setting the boolean factor to select between defined bandwidth for each dependent connection or aggregate bandwidth for all connections; and h. setting the boolean factor $I_k$ equal to 1 for selecting aggregate bandwidth for all connections or setting the boolean factor $I_k$ equal to 0 for selecting defined bandwidth for all connections.

* * * * *

UNITED STATES PATENT AND TRADEMARK OFFICE
CERTIFICATE OF CORRECTION

PATENT NO. : 6,647,008 B1
DATED : November 11, 2003
INVENTOR(S) : Claude Galand et al.

It is certified that error appears in the above-identified patent and that said Letters Patent is hereby corrected as shown below:

<u>Title page,</u>
Item [73], Assignee, delete "IBM Corporation, Armonk, NY (US)" and substitute therefore -- Cisco Technology, Inc., San Jose, California (US) --

Signed and Sealed this

Eighth Day of June, 2004

JON W. DUDAS
*Acting Director of the United States Patent and Trademark Office*